United States Patent
Ono et al.

(10) Patent No.: US 10,544,513 B2
(45) Date of Patent: Jan. 28, 2020

(54) ELECTROCHEMICAL REACTION DEVICE

(71) Applicant: Kabushiki Kaisha Toshiba, Minato-ku (JP)

(72) Inventors: Akihiko Ono, Kita (JP); Satoshi Mikoshiba, Yamato (JP); Jun Tamura, Minato (JP); Ryota Kitagawa, Setagaya (JP); Yuki Kudo, Yokohama (JP); Eishi Tsutsumi, Kawasaki (JP); Masakazu Yamagiwa, Yokohama (JP); Yoshitsune Sugano, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/286,837

(22) Filed: Feb. 27, 2019

(65) Prior Publication Data
US 2019/0194815 A1   Jun. 27, 2019

Related U.S. Application Data

(63) Continuation of application No. 15/220,872, filed on Jul. 27, 2016, now abandoned.

(51) Int. Cl.
*C25B 9/00* (2006.01)
*C25B 15/08* (2006.01)
(Continued)

(52) U.S. Cl.
CPC .............. *C25B 9/18* (2013.01); *C25B 1/003* (2013.01); *C25B 1/04* (2013.01); *C25B 9/06* (2013.01);
(Continued)

(58) Field of Classification Search
CPC .. C25B 9/06; C25B 9/00; C25B 15/08; C25B 9/04; C25B 1/06; C25B 1/46; C25B 9/18; C25B 9/206
(Continued)

(56) References Cited

U.S. PATENT DOCUMENTS

| 3,827,964 | A | 8/1974 | Okubo |
| 8,486,251 | B2 * | 7/2013 | Koveal ................ C10G 19/02 |
| | | | 205/347 |
| 2010/0133111 | A1 | 6/2010 | Nocera et al. |

FOREIGN PATENT DOCUMENTS

| GB | 794490 | * 5/1958 | ............... C25C 1/22 |
| JP | 10-121281 | 5/1998 | |

(Continued)

OTHER PUBLICATIONS

Miguel A. Modestino et al. "Robust Production of Purified $H_2$ in a Stable, Self-Regulating, and Continuously Operating Solar Fuel Generator", Energy and Environmental Science, vol. 7, 2014, 5 pages.

*Primary Examiner* — Zulmariam Mendez
(74) *Attorney, Agent, or Firm* — Oblon, McClelland, Maier & Neustadt, L.L.P.

(57) ABSTRACT

An electrochemical reaction device includes: a first electrolytic solution tank having a first storage part and a second storage part; a second electrolytic solution tank having a third storage part and a fourth storage part; a first reduction electrode layer immersed in a first electrolytic solution; a first oxidation electrode layer immersed in a second electrolytic solution; a first generator electrically connected to the first reduction electrode and the first oxidation electrode layer; a second reduction electrode layer immersed in a third electrolytic solution; a second oxidation electrode layer immersed in a fourth electrolytic solution; a second generator electrically connected to the second reduction electrode and the second oxidation electrode layer; and at least one flow path out of a first flow path connecting the first storage part and the fourth storage part and a second flow path connecting the second storage part and the third storage part.

8 Claims, 11 Drawing Sheets

(51) Int. Cl.
  *C25B 9/04* (2006.01)
  *C25B 1/06* (2006.01)
  *C25B 9/18* (2006.01)
  *C25B 9/06* (2006.01)
  *C25B 15/02* (2006.01)
  *C25B 1/04* (2006.01)
  *C25B 1/00* (2006.01)

(52) U.S. Cl.
  CPC ............... *C25B 15/02* (2013.01); *Y02E 10/52* (2013.01); *Y02E 60/366* (2013.01); *Y02P 20/135* (2015.11)

(58) Field of Classification Search
  USPC .................................................. 204/242, 257
  See application file for complete search history.

(56) References Cited

FOREIGN PATENT DOCUMENTS

| | | |
|---|---|---|
| JP | 2001-225075 | 8/2001 |
| JP | 2012-505310 | 3/2012 |
| JP | 2012-177150 | 9/2012 |

\* cited by examiner

US 10,544,513 B2

ELECTROCHEMICAL REACTION DEVICE

CROSS-REFERENCE TO RELATED APPLICATION

This application is a continuation of U.S. patent application Ser. No. 15/220,872, filed Jul. 27, 2016, now pending, which is based upon and claims the benefit of priority from Japanese Patent Application No. 2015-152262, filed on Jul. 31, 2015; the entire contents of both which are incorporated herein by reference.

FIELD

Embodiments disclosed herein generally relate to an electrochemical reaction device.

BACKGROUND

The development of artificial photosynthesis technology that replicates photosynthesis of plants to electrochemically convert sunlight to a chemical substance has been recently progressing in consideration of an energy problem and an environmental problem. Converting sunlight to a chemical substance to store it in a cylinder or a tank is advantageous in that it costs lower for energy storage and has a less storage loss than converting sunlight to electricity to store it in a battery.

A known electrochemical reaction device that electrochemically converts sunlight to a chemical substance is, for example, a two-electrode device including an electrode having a reduction catalyst for reducing carbon dioxide ($CO_2$) and an electrode having an oxidation catalyst for oxidizing water ($H_2O$), the electrodes being immersed in water containing dissolved carbon dioxide. In this case, these electrodes are electrically connected to each other via an electric wire or the like. The electrode having the oxidation catalyst oxidizes $H_2O$ using light energy to produce oxygen ($½O_2$) and obtain a potential. The electrode having the reduction catalyst obtains the potential from the electrode that causes the oxidation reaction, thereby reducing carbon dioxide to produce formic acid (HCOOH) or the like. Such two-stage excitation for obtaining the reduction potential of the carbon dioxide makes the two-electrode device low in conversion efficiency from the sunlight to the chemical energy.

An electrochemical reaction device including a stack (silicon solar cell or the like) of a pair of electrodes and a photoelectric conversion layer sandwiched therebetween is also under investigation. The electrode on a light irradiated side oxidizes water ($2H_2O$) using light energy to produce oxygen ($O_2$) and hydrogen ions ($4H^+$). The electrode on the opposite side uses the hydrogen ions ($4H^+$) produced in the electrode on the light irradiated side and a potential ($e^-$) generated in the photoelectric conversion layer to product hydrogen ($2H_2$) or the like as a chemical substance. An electrochemical reaction device including a stack of silicon solar cells is also known. The aforesaid electrochemical reaction device preferably has high conversion efficiency.

DETAILED DESCRIPTION

A electrochemical reaction device of an embodiment includes: a first electrolytic solution tank having a first storage part storing a first electrolytic solution and a second storage part storing a second electrolytic solution; a second electrolytic solution tank having a third storage part storing a third electrolytic solution and a fourth storage part storing a fourth electrolytic solution; a first reduction electrode layer immersed in the first electrolytic solution; a first oxidation electrode layer immersed in the second electrolytic solution; a first generator electrically connected to the first reduction electrode and the first oxidation electrode layer; a second reduction electrode layer immersed in the third electrolytic solution; a second oxidation electrode layer immersed in the fourth electrolytic solution; a second generator electrically connected to the second reduction electrode and the second oxidation electrode layer; and at least one flow path out of a first flow path connecting the first storage part and the fourth storage part and a second flow path connecting the second storage part and the third storage part.

Embodiments will be hereinafter described with reference to the drawings. The drawings are schematic, and for example, the sizes such as the thickness and width of each constituent element may differ from the actual sizes of the constituent element. In the embodiments, substantially the same constituent elements are denoted by the same reference signs and a description thereof will be omitted in some case. In this specification, "to connect" not only means "to directly connect" but also may include the meaning of "to indirectly connect".

First Embodiment

Figure 1:
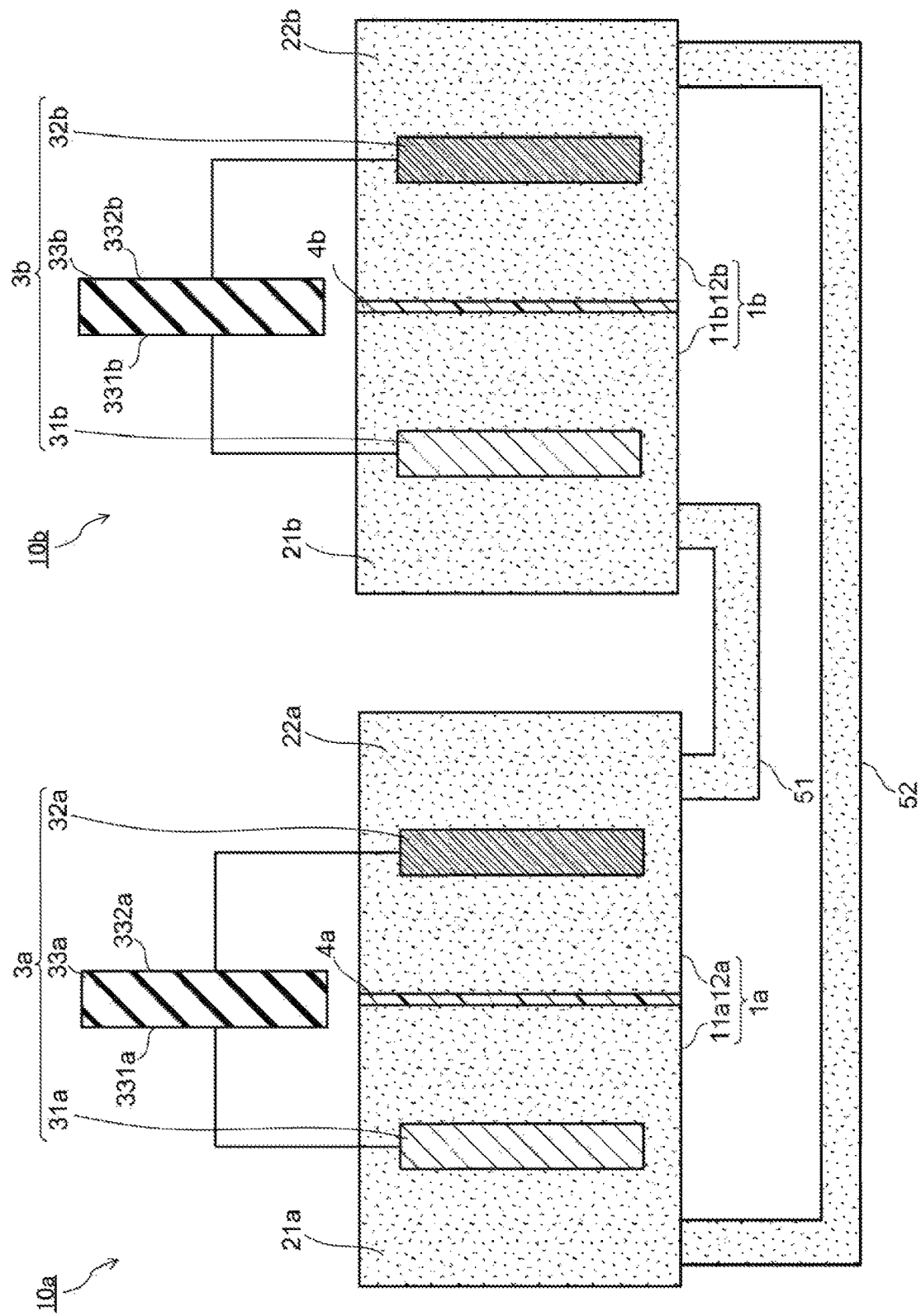
FIG. 1 is a schematic view illustrating a structure example of an electrochemical reaction device.

FIG. 1 is a schematic view illustrating a structure example of an electrochemical reaction device. The electrochemical reaction device illustrated in FIG. 1 includes an electrolytic solution tank 1a, an electrolytic solution tank 1b, a reduction electrode layer 31a, a reduction electrode layer 31b, an oxidation electrode layer 32a, an oxidation electrode layer 32b, a photoelectric conversion layer 33a, a photoelectric conversion layer 33b, a flow path 51, and a flow path 52.

One unit having one electrolytic solution tank, one reduction electrode layer, one oxidation electrode layer, and one photoelectric conversion layer can be regarded as one electrochemical reaction unit. For example, the electrochemical reaction device illustrated in FIG. 1 includes: an electrochemical reaction unit 10a having the electrolytic solution tank 1a, the redaction electrode layer 31a, the oxidation electrode layer 32a, and the photoelectric conversion layer 33a; and an electrochemical reaction unit 10b having the electrolytic solution tank 1b, the reduction electrode layer 31b, the oxidation electrode layer 32b, and the photoelectric conversion layer 33b.

The electrochemical reaction unit has a generator to apply a voltage between the reduction and oxidation electrode layers. The generator is electrically connected to the reduction and oxidation electrode layers. The generator is not limited to the photoelectric conversion element having the photoelectric conversion layer. Examples of the generator include a system power supply, a storage battery, or the renewable energy such as the wind power, water power, and the geothermal power.

A structure having one reduction electrode layer, one oxidation electrode layer, and one photoelectric conversion layer can be regarded as one photoelectric conversion cell. For example, the electrochemical reaction device illustrated in FIG. 1 includes: a photoelectric conversion cell 3a having the reduction electrode layer 31a, the oxidation electrode layer 32a, and the photoelectric conversion layer 33a; and a photoelectric conversion cell 3b having the reduction electrode layer 31b, the oxidation electrode layer 32b, and the photoelectric conversion layer 33b.

The electrolytic solution tank 1a has a storage part 11a storing an electrolytic solution 21a and a storage part 12a storing an electrolytic solution 22a. The electrolytic solution tank 1b has a storage part 11b storing an electrolyte solution 21b and a storage part 12b storing an electrolytic solution 22b. The electrolytic solution tank 1a and the electrolytic solution tank 1b are not limited to a particular shape and may have any three-dimensional shape having a cavity serving as the storage part.

The storage part 11a and the storage part 12a are separated from each other by, for example, an ion exchange membrane 4a. The storage part 11b and the storage part 12b are separated from each other by, for example, an ion exchange membrane 4b. Examples of membranes usable as the ion exchange membrane 4a and the ion exchange membrane 4b include NEOSEPTA (registered trademark) manufactured by ASTOM Corporation, SELEMION (registered trademark) and Aciplex (registered trademark) manufactured by Asahi Glass Co. Ltd., fumasep (registered trademark) and fumapem (registered trademark) manufactured by Fumatech GmbH, Nafion (registered trademark), which is a fluorocarbon resin obtained through polymerization of sulfonated tetrafluoroethylene, manufactured by Du Pont, Lewabrane (registered trademark) manufactured by LANXESS, IONSEP (registered trademark) manufactured by IONTECH, Mustang (registered trademark) manufactured by Pall Corporation, ralex (registered trademark) manufactured by MEGA a.s., and Gore-Tex (registered trademark) manufactured by W. L. Gore & Associates. The ion exchange membrane 4a and the ion exchange membrane 4b each may be formed of a film having a hydrocarbon basic skeleton or for anion exchange, may be formed of a film having an amine group.

The electrolytic solution 21a and the electrolytic solution 21b each at least contain a substance to be reduced. The substance to be reduced is a substance that is to be reduced through a reduction reaction. Examples of the substance to be reduced include carbon dioxide. Changing an amount of water contained in the electrolytic solution 21a and the electrolytic solution 21b or components of the electrolytic solutions can change a production ratio of a chemical substance.

The electrolytic solution 22a and the electrolytic solution 22b each at least contain a substance to be oxidized. The substance to be oxidized is a substance that is to be oxidized through an oxidation reaction. Examples of the substance to be oxidized include water. The electrolytic solution 21a, the electrolytic solution 21b, the electrolytic solution 22a, and the electrolytic solution 22b may contain the same substance. In this case, the electrolytic solution 21a, the electrolytic solution 22a, the electrolytic solution 21b, and the electrolytic solution 22b may be regarded as one electrolytic solution. Other examples of the substance to be oxidized include organic matters such as alcohol and amine.

The electrolytic solution 22a preferably has higher pH than pH of the electrolytic solution 21a. The electrolytic solution 22b preferably has higher pH than pH of the electrolytic solution 21b. This facilitates the migration of hydrogen ions, hydroxide ions, and the like. Further, a liquid junction potential due to the difference in pH enables effective progress of an oxidation-reduction reaction.

The reduction electrode layer 31a is immersed in the electrolytic solution 21a. The reduction electrode layer 31b is immersed in the electrolytic solution 21b. The reduction electrode layer 31a and the reduction electrode layer 31b each contain, for example, a reduction catalyst for the substance to be reduced. A compound produced by the reduction reaction differs depending on, for example, the kind of the reduction catalyst. Examples of the compound produced by the reduction reaction include: carbon compounds such as carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), and ethylene glycol; and hydrogen. The compound produced by the reduction reaction is recovered through, for example, a recovery path. At this time, the recovery path is connected to, for example, the storage part 11a and the storage part 11b.

The reduction electrode layer 31a and the reduction electrode layer 31b each may have a thin film-shaped, lattice-shaped, particulate, or wire-shaped structure, for instance. The reduction electrode layer 31a and the reduction electrode layer 31b do not necessarily contain the reduction catalyst. A reduction catalyst layer provided separately from the reduction electrode layer 31a may be electrically connected to the reduction electrode layer 31a. A reduction catalyst layer provided separately from the reduction electrode layer 31b may be electrically connected to the reduction electrode layer 31b.

The oxidation electrode layer 32a is immersed in the electrolytic solution 22a. The oxidation electrode layer 32b is immersed in the electrolytic solution 22b. The oxidation electrode layer 32a and the oxidation electrode layer 32b each contain, for example, an oxidation catalyst for the substance to be oxidized. A compound produced by the oxidation reaction differs depending on, for example, the kind of the oxidation catalyst. Examples of the compound produced by the oxidation reaction include hydrogen ions. The compound produced by the oxidation reaction is recovered through, for example, a recovery path. At this time, the recovery path is connected to, for example, the storage part 12a and the storage part 12b.

The oxidation electrode layer 32a and the oxidation electrode layer 32b each may have a thin film-shaped, lattice-shaped, particulate, or wire-shaped structure, for instance. The oxidation electrode layer 32a and the oxidation electrode layer 32b do not necessarily contain the oxidation catalyst. An oxidation catalyst layer provided separately from the oxidation electrode layer 32a may be electrically connected to the oxidation electrode layer 32a. An oxidation catalyst layer provided separately from the oxidation electrode layer 32b may be electrically connected to the oxidation electrode layer 32b.

In a case where the oxidation electrode layer 32a and the photoelectric conversion layer 32a are stacked and immersed in the electrolytic solution and the oxidation electrode layer 32b and the photoelectric conversion layer 33b are stacked and immersed in the electrolytic solution, and where the photoelectric conversion layer 33a is irradiated with light through the oxidation electrode layer 32a and the photoelectric conversion layer 33b is irradiated with light through the oxidation electrode layer 32b, the oxidation electrode layer 32a and the oxidation electrode layer 32b need to have a light transmitting property. Light transmittance of the oxidation electrode layer 32a is preferably, for example, at least 10% or more, more preferably 30% or more of an irradiation amount of the light irradiating the oxidation electrode layer 32a. Light transmittance of the oxidation electrode layer 32b is preferably, for example, at least 10% or more, more preferably 30% or more of an irradiation amount of the light irradiating the oxidation electrode layer 32b. This is not restrictive, and the photoelectric conversion layer 33a may be irradiated with light through the reduction electrode layer 31a and the photoelectric conversion layer 33b may be irradiated with light through the reduction electrode layer 31b, for instance.

The photoelectric conversion layer 33a has a face 331a electrically connected to the reduction electrode layer 31a and a face 332a electrically connected to the oxidation electrode layer 32a. The photoelectric conversion layer 33b has a face 331b electrically connected to the reduction electrode layer 31b and a face 332b electrically connected to the oxidation electrode layer 32b. The face 331a and the reduction electrode layer 31a, the face 331b and the reduction electrode layer 31b, the face 322a and the oxidation electrode layer 32a, and the face 332b and the oxidation electrode layer 32b are preferably connected by wiring lines having a heat transfer property. Connecting the photoelectric conversion layer to the reduction electrode layer or the oxidation electrode layer by the wiring line or the like is advantageous as a system, since constituent elements are separated according to the function. The photoelectric conversion layer 33a may be provided outside the electrolytic solution tank 1a, and the photoelectric conversion layer 33b may be provided outside the electrolytic solution tank 1b.

The photoelectric conversion layer 33a and the photoelectric conversion layer 33b each have a function of separating electric charges using energy of the irradiating light such as sunlight. Electrons and holes generated by the charge separation migrate toward the reduction electrode layer and toward the oxidation electrode layer respectively. Consequently, the photoelectric conversion layer 33a and the photoelectric conversion layer 33b can generate electromotive forces. As the photoelectric conversion layer 33a and the photoelectric conversion layer 33b, pn-junction or pin-junction photoelectric conversion lovers are usable, for instance. The photoelectric conversion layer 33a may be fixed to the electrolytic solution tank 1a, for instance, and the photoelectric conversion layer 33b may be fixed to the electrolytic solution tank 1b, for instance. Incidentally, the photoelectric conversion layer 33a and the photoelectric conversion layer 33b each may be formed of a stack of a plurality of photoelectric conversion layers.

The reduction electrode layer 31a, the oxidation electrode layer 32a, and the photoelectric conversion layer 33a may be different in size. The reduction electrode layer 31b, the oxidation electrode layer 32b, and the photoelectric conversion layer 33b may be different in size.

The flow path 51 connects the storage part 12a and the storage part 11b. Ions and other substances contained in the electrolytic solution 22a and the electrolytic solution 21b can move between the storage part 12a and the storage part 11b through the flow path 51.

The flow path 52 connects the storage part 11a and the storage part 12b. Ions and other substances contained in the electrolytic solution 21a and the electrolytic solution 22b can move between the storage part 11a and the storage part 12b through the flow path 52. The length of the flow path 52 may be different from or equal to the length of the flow path 51. The flow path 52 may intersect with the flow path 51.

The electrochemical reaction device of this embodiment includes at least one flow path out of the flow path 51 and the flow path 52. The flow path 51 and the flow path 52 are not limited to a particular shape and may have any shape having a cavity allowing the electrolytic solution to flow therethrough, such as a pipe shape. A circulating pump may be provided to circulate the electrolytic solution in at least one flow path out of the flow path 51 and the flow path 52.

The storage part 11a, the storage part 11b, the storage part 12a, the storage part 12b, the flow path 51, and the flow path 52 each may be formed of, for example, a material that transmits light.

Figure 2:
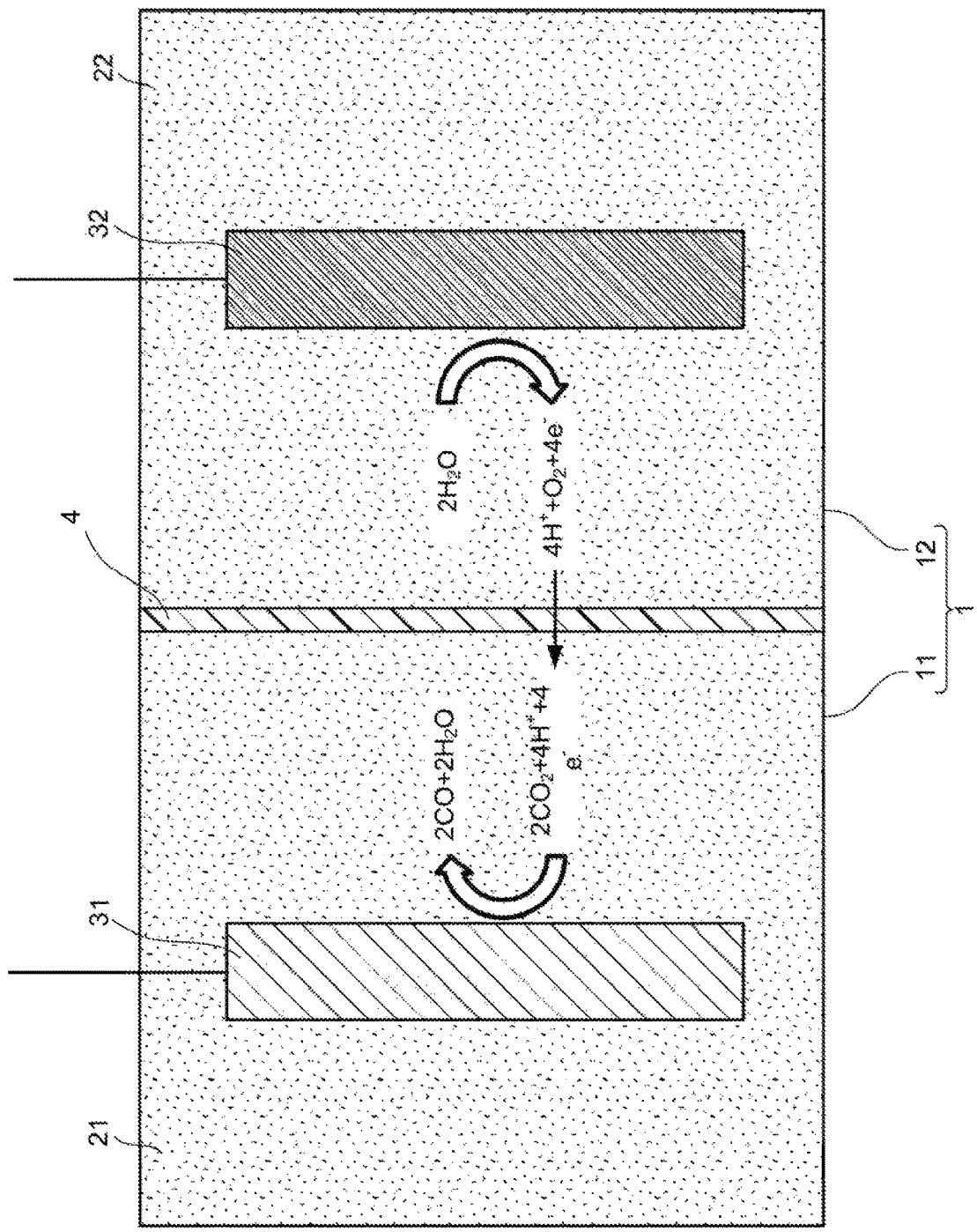
FIG. 2 is a schematic view illustrating an operation example of the electrochemical reaction device.

An operation example of the electrochemical reaction device will be described with reference to FIG. 2. FIG. 2 is an explanatory schematic view of the operation example of the electrochemical reaction device. FIG. 2 illustrates an electrolytic solution tank 1 having a storage part 11 storing an electrolytic solution 21 and a storage part 12 storing an electrolytic solution 22, a reduction electrode layer 31 immersed in the electrolytic solution 21, an oxidation electrode layer 32 immersed in the electrolytic solution 22, and an ion exchange membrane 4 separating the storage part 11 and the storage part 12. The reduction electrode layer 31 is electrically connected to a first face of a not-illustrated photoelectric conversion layer, and the oxidation electrode layer 32 is electrically connected to a second face of the photoelectric conversion layer.

For the description of the electrolytic solution tank 1, the description of the electrolytic solution tank 1a and the electrolytic solution tank 1b can be referred to when necessary. For the description of the storage part 11, the description of the storage part 11a and the storage part 11b can be referred to when necessary. For the description of the storage part 12, the description of the storage part 12a and the storage part 12b can be referred to when necessary. For the description of the electrolytic solution 21, the description of the electrolytic solution 21a and the electrolytic solution 21b can be referred to when necessary. For the description of the electrolytic solution 22, the description of the electrolytic solution 22a and the electrolytic solution 22b can be referred to when necessary. For the description of the reduction electrode layer 31, the description of the reduction electrode layer 31a and the reduction electrode layer 31b can be referred to when necessary. For the description of the oxidation electrode layer 32, the description of the oxidation electrode layer 32a and the oxidation electrode layer 32b can be referred to when necessary. For the description of the photoelectric conversion layer, the description of the photoelectric conversion layer 33a and the photoelectric conversion layer 33b can be referred to when necessary, for the description of the first face, the description of the face 331a and the face 331b can be referred to when necessary, and for the description of the second face, the description of the face 332a and the face 332b can be referred to when necessary.

When light enters the photoelectric conversion layer, the photoelectric conversion layer generates photoexcited electrons and holes. At this time, the photoexcited electrons gather to the reduction electrode layer 31, and the holes gather to the oxidation electrode layer 32. Consequently, an electromotive force is generated in the photoelectric conversion layer. The light is preferably sunlight, but the light entering the photoelectric conversion layer may be light of a light-emitting diode, or an organic EL, or the like.

The following describes a case where electrolytic solutions containing water and carbon dioxide are used as the electrolytic solution 21 and the electrolytic solution 22 and methanol is produced. Around the oxidation electrode layer 32, as expressed by the following equation (1), the water undergoes an oxidation reaction and loses electrons, so that oxygen and hydrogen ions are produced. At least one of the produced hydrogen ions migrates to the storage part 11 through the ion exchange membrane 4.

$$2H_2O \rightarrow 4H^+ + O_2 + 4e^- \quad (1)$$

Around the reduction electrode layer 31, as expressed by the following equation (2), the carbon dioxide undergoes a reduction reaction and the hydrogen ions react with the carbon dioxide while receiving the electrons, so that methanol and water are produced. The methanol dissolves in the electrolytic solution 21 at an optional ratio. Further, in addition to the methanol, hydrogen is produced by the hydrogen ions receiving the electrons as expressed by the following equation (3). At this time, the hydrogen may be produced simultaneously with the methanol.

$$CO_2 + 6H^+ + 4e^- \rightarrow CH_3OH + H_2O \quad (2)$$

$$2H^+ + 2e^- \rightarrow H_2 \quad (3)$$

The photoelectric conversion layer 33 needs to have an open-circuit voltage equal to or larger than a potential difference between a standard oxidation-reduction potential of the oxidation reaction and a standard oxidation-reduction potential of the reduction reaction. For example, the standard oxidation-reduction potential of the oxidation reaction in the equation (1) is 1.23 [V]. The standard oxidation-reduction potential of the reduction reaction in the equation (2) is 0.03 [V]. The standard oxidation-reduction potential of the oxidation reaction in the equation (3) is 0 [V]. At this time, in the reactions of the equation (1) and the equation (2), the open-circuit voltage needs to be 1.26 [V] or higher.

The open-circuit voltage of the photoelectric conversion layer 33 is preferably higher than the potential difference between the standard oxidation-reduction potential of the oxidation reaction and the standard oxidation-reduction potential of the reduction reaction by a value of overvoltage or more. For example, the overvoltages of the oxidation reaction in the equation (1) and the reduction reaction in the equation (2) are both 0.2 [V]. In the reactions of the equation (1) and the equation (2), the open-circuit voltage is preferably 1.66 [V] or higher. Similarly, in the reactions of the equation (1) and the equation (3), the open-circuit voltage is preferably 1.43 V or higher.

The reduction reaction of carbon dioxide is a reaction consuming hydrogen ions. This means that a small amount of the hydrogen ions results in low efficiency of the reduction reaction. So, the electrolytic solution 21 and the electrolytic solution 22 preferably have different hydrogen ion concentrations so that the concentration difference facilitates the migration of the hydrogen ions. The concentration of negative ions (for example, hydroxide ions) may be different between the electrolytic solution 21 and the electrolytic solution 22.

The electrochemical reaction device of this embodiment includes the plural electrolytic solution tanks. In the plural electrolytic solution tanks, the reduction electrode layers and the oxidation electrode layers cause the oxidation-reduction reactions of the electrolytic solutions. Causing the oxidation-reduction reactions in the plural electrolytic solution tanks increases a reaction amount. This can enhance conversion efficiency from light to a chemical substance.

As a result of the oxidation-reduction reaction, pH of the electrolytic solution on the reduction electrode layer side (first electrolytic solution) decreases, whereas pH of the electrolytic solution on the oxidation electrode layer side (second electrolytic solution) increases. As a pH difference increases by one, a 6.0 mV liquid junction potential occurs. Accordingly, as the oxidation-reduction reaction progresses more, the electrolytic solution has a lower potential to be more difficult to react.

In the plural electrolytic solution tanks, the first storage parts are connected in series and the second storage parts are connected in series, for instance. In this case, the first electrolytic solution in the first electrolytic solution tank is supplied to the first storage part of the second electrolytic solution tank, and the second electrolytic solution in the first electrolytic solution tank is supplied to the second storage part of the second electrolytic solution tank.

The first electrolytic solution in the second electrolytic solution tank has higher pH than pH of the first electrolytic solution in the first electrolytic solution tank. The second electrolytic solution in the second electrolytic solution tank has lower pH than pH of the second electrolytic solution in the first electrolytic solution tank. Accordingly, a reaction amount of the reduction reaction in the second electrolytic solution tank is smaller than that of the reduction reaction in the first electrolytic solution tank. A reaction amount of the oxidation reaction in the second electrolytic solution tank is smaller than that of the oxidation reaction in the first electrolytic solution tank.

A possible way to reduce the variation in the reaction amount among the plural electrolytic solution tanks may be to connect the plural electrolytic solution tanks in parallel. This, however, may increase the device area and the manufacturing cost due to an increase of the whole length of the flow paths.

If the plural electrolytic solution tanks are connected in parallel, the flow rates of the electrolytic solutions supplied to the electrolytic solution tanks may become different from each other. For example, if pressure losses of the flow paths of the electrolytic solution tanks are different from each other, there occurs a variation in the flow rates of the electrolytic solutions. In a case where the produced gas and the electrolytic solution are supplied through the same flow path, multiphase flow such as gas-liquid two-phase flow is generated in the flow path to increase the pressure loss. In a part where the reaction amount is large, the pressure loss is large and accordingly an amount of the supplied electrolytic solution is small. In a part where the reaction amount is small, an amount of the produced gas is small and the pressure loss is small. Accordingly, an amount of the supplied electrolytic solution is large there.

Therefore, an amount of the supplied electrolytic solution is small in a part where a large amount of the electrolytic solution is required, whereas an amount of the supplied electrolytic solution is large in a part where a small amount of the electrolytic solution is required. The variation in the supply amounts of the electrolytic solutions is also caused by air bubbles generated by the oxidation-reduction reaction, a viscosity change of the electrolytic solution due to its concentration change, and a change in the reaction amount due to a change of an amount of incident light. The electrolytic solutions are preferably supplied uniformly to the electrochemical reaction units. Further, the electrolytic solution is preferably supplied according to the reaction amount of each of the electrochemical reaction units.

The electrochemical reaction device of this embodiment includes at least one flow path out of a flow path series-connecting the first storage part in the first electrolytic solution tank and the second storage part in the second electrolytic solution tank and a flow path series-connecting the second storage part in the first electrolytic solution tank and the first storage part in the second electrolytic solution tank. This structure enables to mix the electrolytic solution having high pH and the electrolytic solution having low pH to decrease a pH difference between the first electrolytic solutions and a pH difference between the second electrolytic solutions in the plural electrolytic solution tanks. This can enhance conversion efficiency, for example, from light to a chemical substance. By the flow path thus connecting the electrolytic solution tank where the oxidation reaction takes place and the electrolytic solution tank where the reduction reaction takes place to enable the movement of the electrolytic solutions between the electrolytic solution tanks, an influence of, for example, changes of pH and electrolytic solution components is reduced. Consequently, conversion efficiency of the whole device can be enhanced.

The electrochemical reaction device of this embodiment is not limited to the structure illustrated in FIG. 1. An electrochemical reaction device illustrated in FIG. 3 is different from the electrochemical reaction device illustrated in FIG. 1 at least in that the face 331a is in contact with the reduction electrode layer 31a, the face 332a is in contact with the oxidation electrode layer 32a, the face 331b is in contact with the reduction electrode layer 31b, and the face 332b is in contact with the oxidation electrode layer 32b.

The photoelectric conversion layer 33a is immersed in at least one of the electrolytic solution 21a and the electrolytic solution 22a, and the photoelectric conversion layer 33b is immersed in at least one of the electrolytic solution 21b and the electrolytic solution 22b. Consequently, the reduction electrode layer, the oxidation electrode layer, and the photoelectric conversion layer are integrated, resulting in a simplified system with a smaller number of parts. This facilitates at least one of, for example, manufacture, installation, and maintenance. Further, this structure eliminates a need for wiring lines connecting the photoelectric conversion layer to the reduction electrode layer and the oxidation electrode layer, enabling increased light transmittance and an increased light-receiving area.

Figure 3:
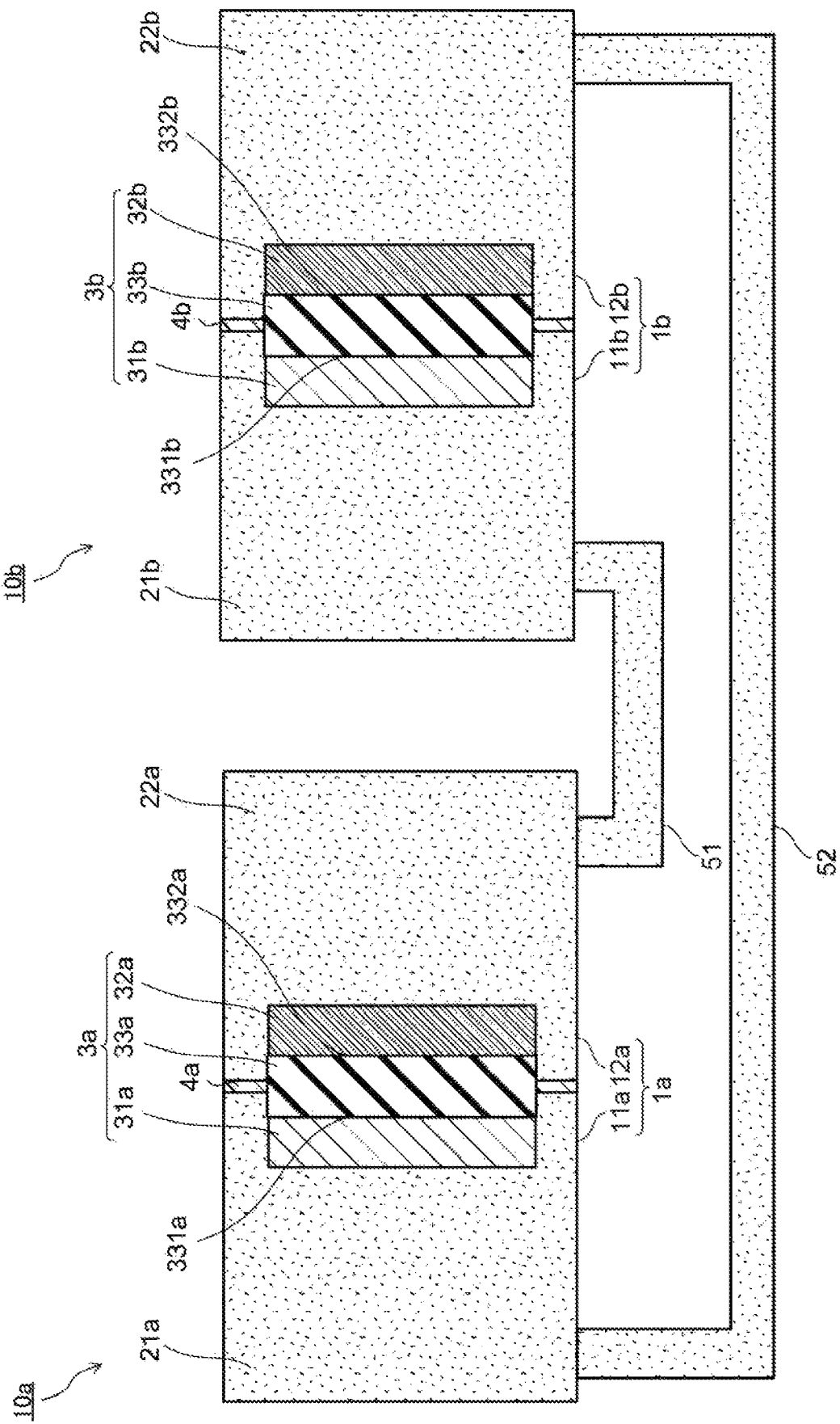
FIG. 3 is a schematic view illustrating another structure example of the electrochemical reaction device.

In the structure illustrated in FIG. 3, the photoelectric conversion layers are in contact with the electrolytic solutions, which may lead to their corrosion and the dissolving of corrosive products in the electrolytic solutions to deteriorate the electrolytic solutions. A possible measure to prevent the corrosion may be to provide protection layers. However, components of the protection layers may dissolve in the electrolytic solutions. Here, providing fillers such as metal ion filters in the flow paths or the electrolytic solution tanks impedes the deterioration of the electrolytic solutions.

Figure 4:
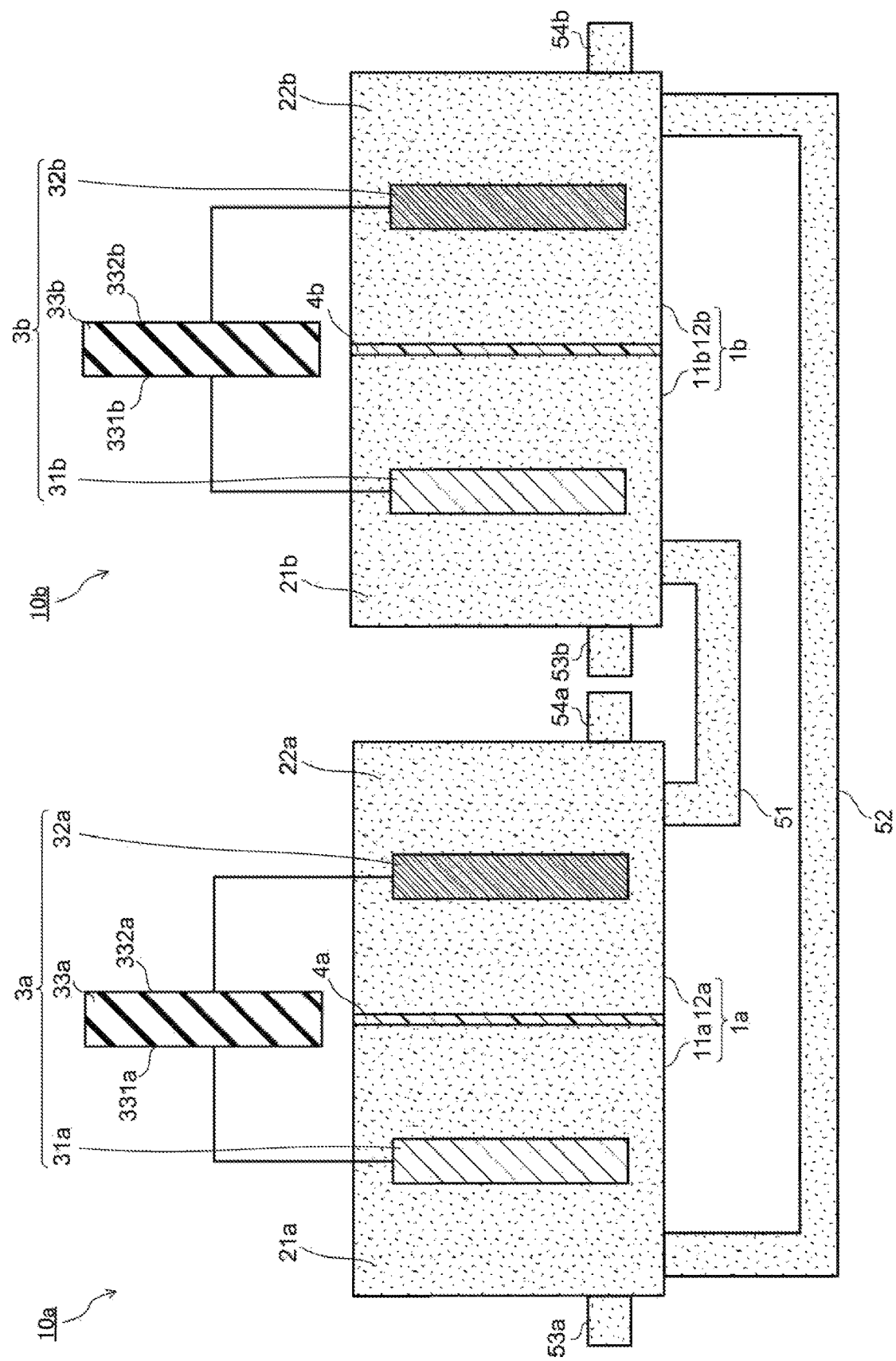
FIG. 4 is a schematic view illustrating another structure example of the electrochemical reaction device.

An electrochemical reaction device illustrated in FIG. 4 is different from the electrochemical reaction device illustrated in FIG. 1 at least in that it includes a flow path 53a connected to the storage part 11a, a flow path 53b connected to the storage part 11b, a flow path 54a connected to the storage part 12a, and a flow path 54b connected to the storage part 12b.

An electrolytic solution containing the same substance as that contained in the electrolytic solution 21a can be additionally supplied through the flow path 53a, for instance. An electrolytic solution containing the same substance as that contained in the electrolytic solution 21b can be additionally supplied through the flow path 53b, for instance. An electrolytic solution containing the same substance as that contained in the electrolytic solution 22a can be additionally supplied though the flow path 54a, for instance. An electrolytic solution containing the same substance as that contained in the electrolytic solution 22b can be additionally supplied through the flow path 54b, for instance. The timing of the additional supply of the electrolytic solutions can be controlled using, for example, a sensor and a control circuit. The sensor has a function of obtaining data of, for example, pH of the electrolytic solutions. The control circuit controls whether to execute the additional supply operation of the electrolytic solutions, based on the data obtained by the sensor.

Figure 5:
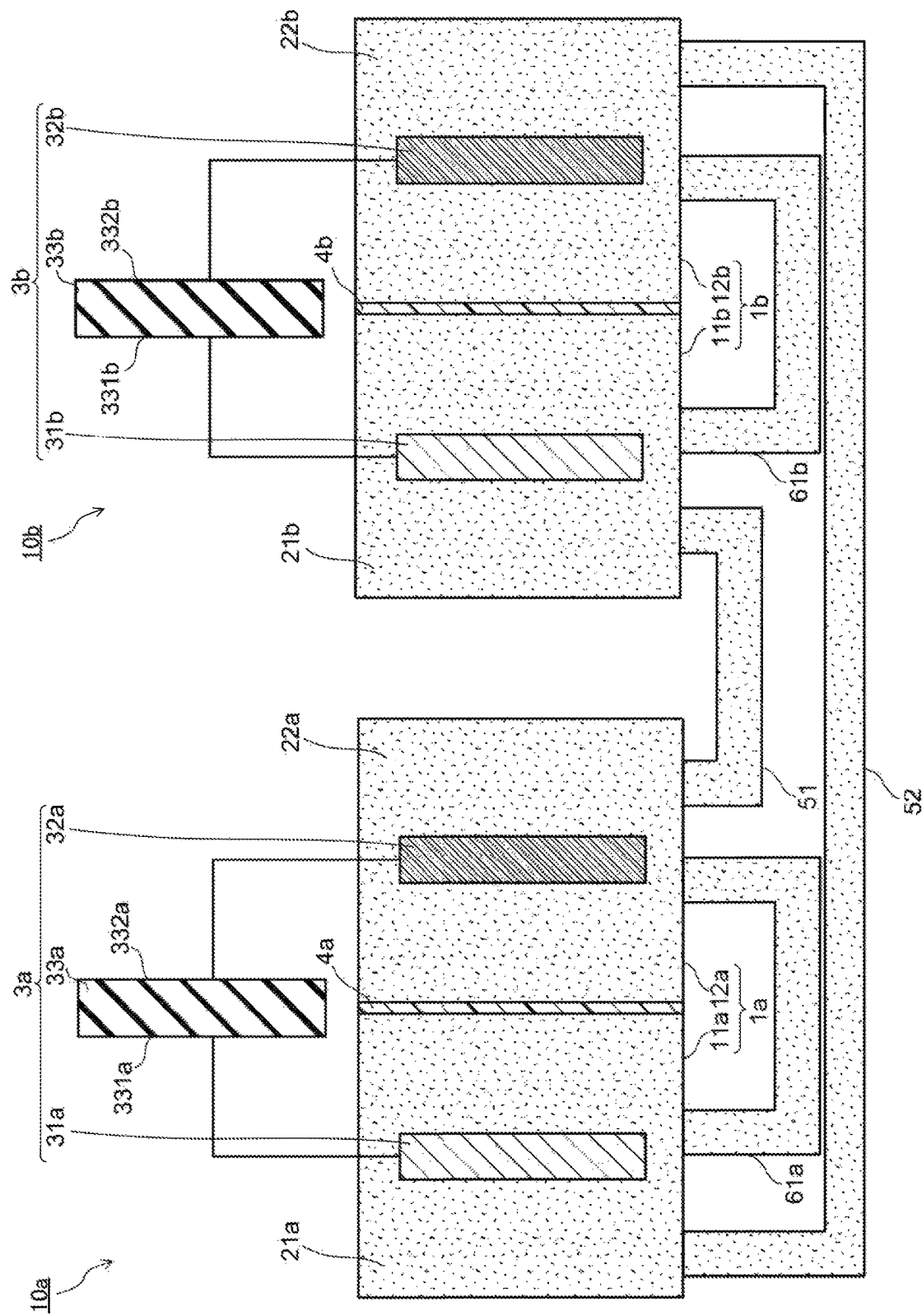
FIG. 5 a schematic view illustrating another structure example of the electrochemical reaction device.

An electrochemical reaction device illustrated in FIG. 5 is different from the electrochemical reaction device illustrated in FIG. 1 at least in that it further includes a flow path 61a connecting the storage part 11a and the storage part 12a and a flow path 61b connecting the storage part 11b and the storage part 12b.

Amounts of light incident on the respective photoelectric conversion layers are sometimes different from each other due to the weather or other factors. In this case, a reaction amount in the electrolytic solution tank 1a and that in the electrolytic solution tank 1b differ from each other. This may lead to elution of metal ions from catalysts due to a pH difference, the deterioration of members such as the electrolytic solution tanks and the flow paths, and efficiency decrease.

In a case where the electrolytic solutions are circulated between the electrolytic solution tank 1a and the electrolytic solution tank 1b, if an amount of light incident on the photoelectric conversion layer 33a is larger than an amount of light incident on the photoelectric conversion layer 33b, pH of the electrolytic solution 21a lowers and pH of the electrolytic solution 22a increases. When the electrolytic solution 21a is supplied to the electrolytic solution 22b and the electrolytic solution 21a is supplied to the electrolytic solution 21b, reaction efficiency in the electrolytic solution tank 1a may lower, and in the electrolytic solution tank 1b, reaction efficiency may lower due to the small amount of the incident light. The total efficiency as a result may lower.

On the other hand, owing to the presence of the flow path 61a and the flow path 61b, the electrolytic solution 21a and the electrolytic solution 22a are circulated to/from each other, and the electrolytic solution 21b and the electrolytic solution 22b are circulated to/from each other. This can reduce a difference in the reaction amount. pH of the electrolytic solution 21a, the electrolytic solution 21b, the electrolytic solution 22a, and the electrolytic solution 22b is preferably adjusted within a range of, for example, not less than 3 nor more than 11 in view of corrosion and environment protection. Further, pH of the electrolytic solution 21a, the electrolytic solution 21b, the electrolytic solution 22a, and the electrolytic solution 22b is preferably not 7.

The electrochemical reaction device illustrated in FIG. 5 may include: a sensor which obtains data indicating at least one state of the temperature, the flow rate, and the pressure of the electrolytic solution flowing in the flow path 61a or the flow path 61b; and a regulator which regulates the state of the electrolytic solution according to the data.

Figure 6:
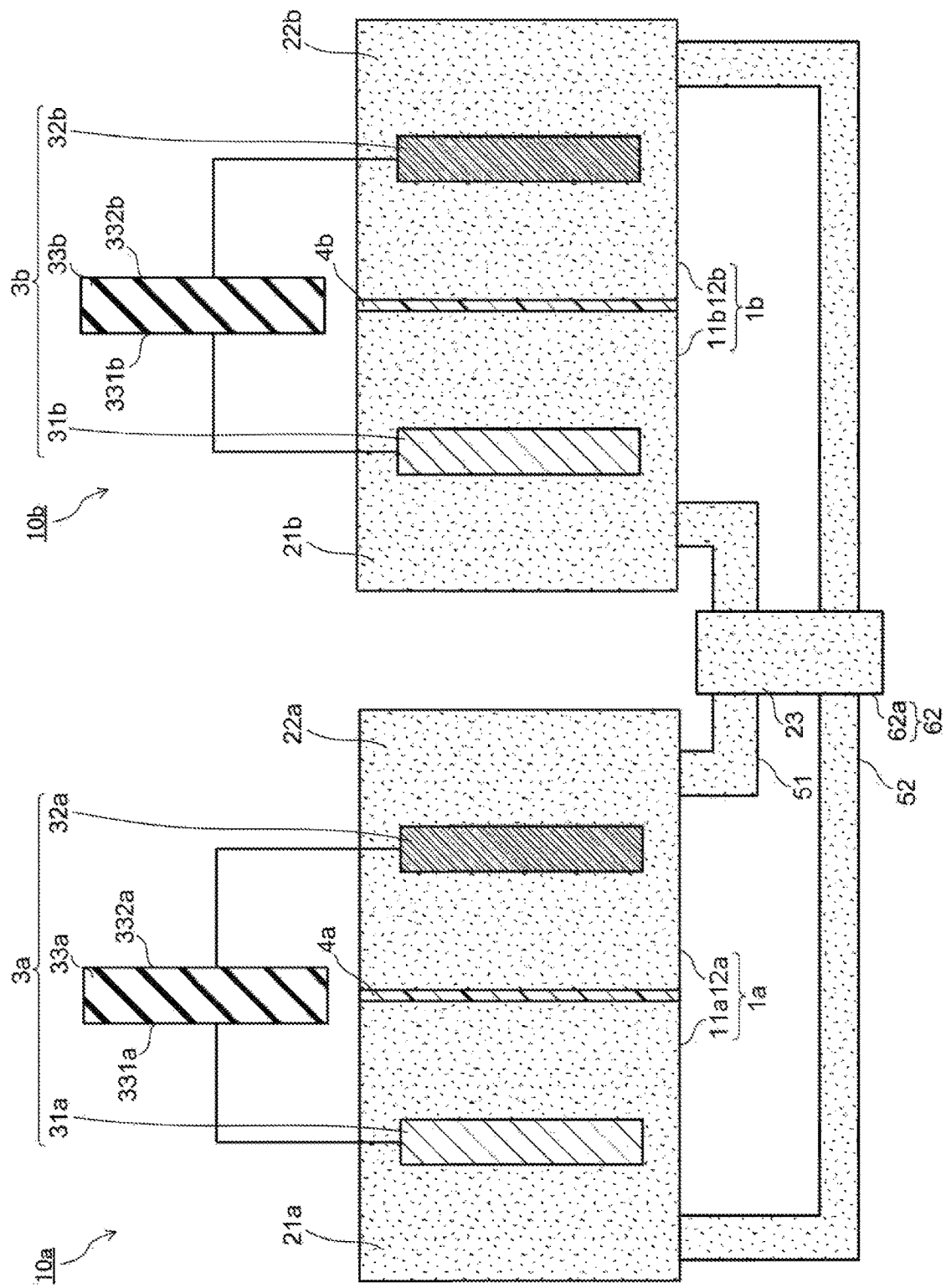
FIG. 6 is a schematic view illustrating another structure example of the electrochemical reaction device.

An electrochemical reaction device illustrated in FIG. 6 is different from the electrochemical reaction device illustrated in FIG. 1 at least in that it further includes a mixing tank 62 having a storage part 62a storing an electrolytic solution 23.

The mixing tank 62 connects the flow path 51 and the flow path 52. The electrolytic solution 23 contains a component of at least one electrolytic solution out of the electrolytic solution 21a, the electrolytic solution 22a, the electrolytic solution 21b, and the electrolytic solution 22b. The mixing tank 62 has, for example, a three-dimensional shape having a cavity serving as the storage part 62a.

An electrode may be provided in the mixing tank 62. The presence of the electrode enables the detection of, for example, the concentration, pH, and temperature of the electrolytic solution, and the deterioration of the electrolytic solution. This enables to calculate, for example, when to change the electrolytic solution, when to change the catalyst layer, and the like. Further, eluted materials of the metal ions from the catalyst layers and eluted materials of the metal ions from the photoelectric conversion layers can be captured using the electrode.

The electrochemical reaction device illustrated in FIG. 6 may include: a sensor which obtains data indicating at least one state of the temperature, the flow rate, and the pressure of the electrolytic solution 23; and a regulator which regulates the state of the electrolytic solution 23 according to the data. For example, when pH of the electrolytic solution 23 falls out of a range of a standard value, at least one of the storage part 11a, the storage part 12a, the storage part 11b, and the storage part 12b may be replenished with the electrolytic solution through the flow path.

Figure 7:
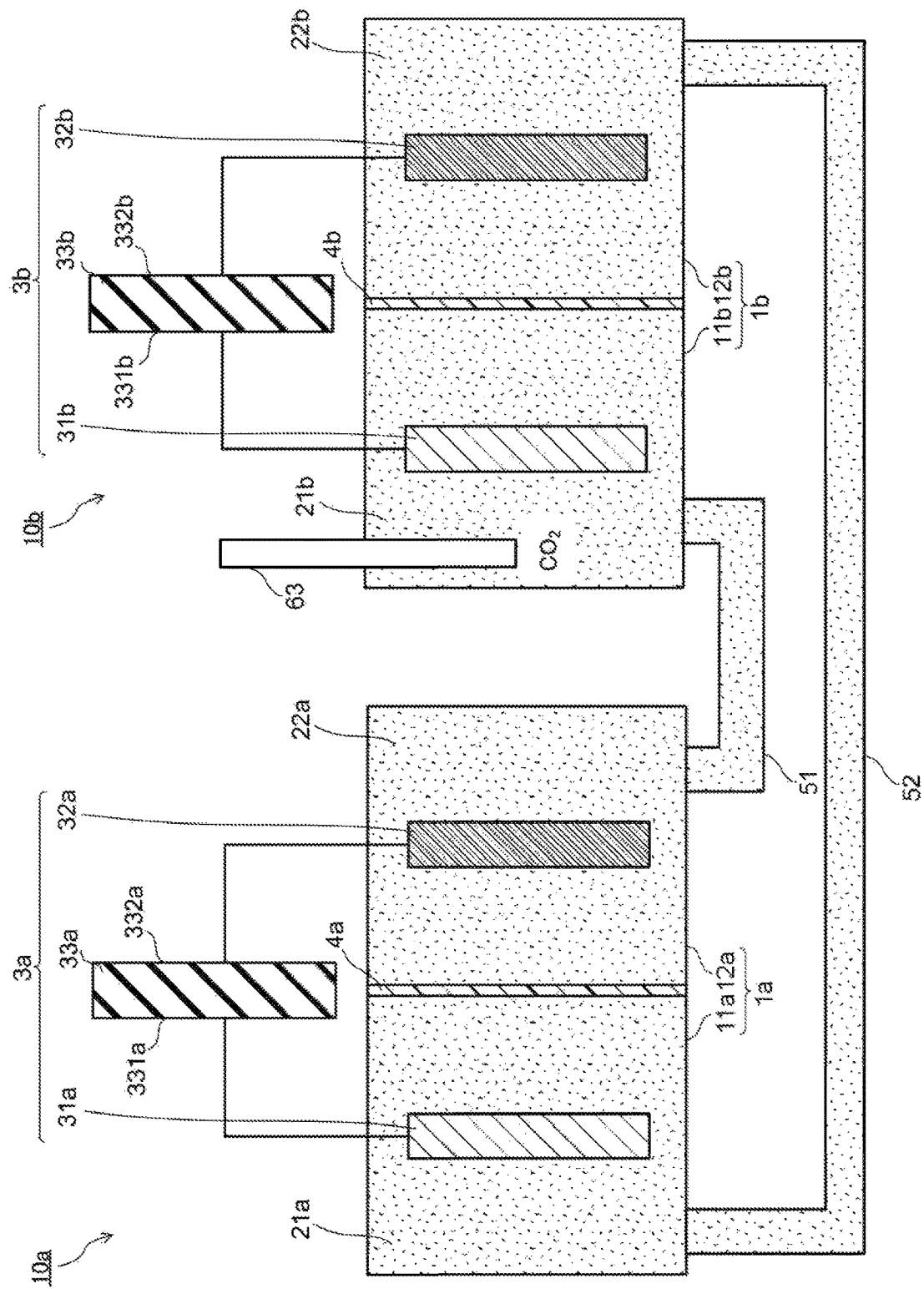
FIG. 7 is a schematic view illustrating another structure example of the electrochemical reaction device.

An electrochemical reaction device illustrated in FIG. 7 is different from the electrochemical reaction device illustrated in FIG. 1 at least in that carbon dioxide is supplied to the electrolytic solution 21b through a carbon dioxide supply part 63. The structure in FIG. 7 is not restrictive, and the carbon dioxide may be supplied to the electrolytic solution 21a through the carbon dioxide supply part 63.

When the carbon dioxide is blown into the electrolytic solution 21b through the carbon dioxide supply part 63, the carbon dioxide dissolves in the electrolytic solution 21b. pH of the electrolytic solution 21b as a result lowers. For example, 0.5 M aqueous potassium hydroxide solutions are used as the electrolytic solution 21a, the electrolytic solution 22a, the electrolytic solution 21b, and the electrolytic solution 22b. When the carbon dioxide is blown into the electrolytic solution 21b which is the 0.5 M aqueous potassium hydroxide solution, the carbon dioxide dissolves in the aqueous potassium hydroxide solution to saturation, so that a 0.5 M aqueous potassium hydrogen carbonate solution ($KHCO_3$) is produced. The 0.5 M aqueous potassium hydrogen carbonate solution has about pH 7, and the 0.5 M aqueous potassium hydroxide solution has about pH 14. Accordingly, due to the pH difference of 7 or more, a potential difference of, for example, 7×60 mV=420 mV occurs as the liquid junction potential. This improves reaction efficiency.

As the oxidation-reduction reaction continues even after the carbon dioxide is blown into the electrolytic solution 21b, the pH difference between the electrolytic solution 21a and the electrolytic solution 21b decreases to lower reaction efficiency. To cope with this, the flow path 51 and the flow path 52 are provided, and the carbon dioxide is reduced in the electrolytic solution tank 1b, whereas the water is oxidized and the hydrogen ions are reduced in the electrolytic solution tank 1a. Owing to the production of hydrogen in the electrolytic solution tank 1a, a pH change of the electrolytic 21a ascribable to the reduction of the carbon dioxide in the electrolytic solution tank 1b can be smaller. This can cause the continuous efficient reaction.

Overvoltage in the reduction reaction of carbon dioxide is usually higher than that in the hydrogen production reaction. This makes the reduction of carbon dioxide more difficult than the reduction of hydrogen ions. Therefore, setting pH of the electrolytic solution 21a and pH of the electrolytic solution 21b to values suitable for the reduction of carbon dioxide can facilitate the reduction of carbon dioxide while enabling the reduction of hydrogen ions.

The both reduction reactions in the electrolytic solution tank 1a and the electrolytic solution tank 1b may be changed between the reduction of the carbon dioxide and the reduction of the hydrogen ions. In this case, a suitable product produced by the reduction of the carbon dioxide is a gaseous substance such as carbon monoxide, methane, and ethylene. The gaseous substance easily separates from other products. Formic acid, methanol, ethanol, acetaldehyde, acetic acid, and the like are easily re-oxidized by the oxidation electrode layer. This may deteriorate reaction efficiency. To prevent this, a product separator may be provided. The product separator is provided in, for example, the electrolytic solution tank 1a, the flow paths 51, 52, or the mixing tank 62. The oxidation electrode layer 32a may have reaction selectivity. This can make the reduction product less likely to re-oxidize.

A structure example of each constituent element in the electrochemical reaction devices illustrated in FIG. 1 to FIG. 7 will now be further described.

As the water-containing electrolytic solution usable as the electrolytic solution, an aqueous solution containing a desired electrolyte is usable, for instance. This solution is preferably an aqueous solution that accelerates the oxidation reaction of water. Examples of the aqueous solution containing the electrolyte include aqueous solutions containing phosphate ions ($PO_4^{2-}$), boric acid ions ($BO_3^{3-}$), sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), or hydrogen carbonate ions ($HCO_3^-$).

Examples of the carbon dioxide-containing electrolytic solution usable as the electrolytic solution include aqueous solutions containing $LiHCO_3$, $NaHCO_3$, $KHCO_3$, $CsHCO_3$, phosphoric acid, or boric acid. The carbon dioxide-containing electrolytic solution may contain alcohol such as methanol, ethanol, or acetone. The water-containing electrolytic solution may be the same as the carbon dioxide-containing electrolytic solution. However, an absorption amount of carbon dioxide in the carbon dioxide-containing electrolytic solution is preferably high. So, a solution different from the water-containing electrolytic solution may be used as the carbon dioxide-containing electrolytic solution. The carbon dioxide-containing electrolytic solution is preferably an electrolytic solution that lowers a reduction potential of carbon dioxide, has high ion conductivity, and contains a carbon dioxide absorbent that absorbs carbon dioxide.

As the aforesaid electrolytic solution, an ionic liquid that contains salt of cations such as imidazolium ions or pyridinium ions and anions such as $BF_4^-$ or $PF_6^-$ and is in a liquid state in a wide temperature range, or its aqueous solution is usable, for instance. Other examples of the electrolytic solution include solutions of amine such as ethanolamine, imidazole, and pyridine, and aqueous solutions thereof. Examples of the amine include primary amine, secondary amine, and tertiary amine. These electrolytic solutions may be high in ion conductivity, have a property of absorbing carbon dioxide, and have a characteristic of lowering reduction energy.

Examples of the primary amine include methylamine, ethylamine, propylamine, butylamine, pentylamine, and hexylamine. Hydrocarbon of the amine may be replaced with, for example, alcohol or halogen. Examples of the amine whose hydrocarbon is replaced include methanolamine, ethanolamine, and chloromethyl amine. Further, an unsaturated bond may be present. The same thing can be said for hydrocarbon of the secondary amine and the tertiary amine.

Examples of the secondary amine include dimethylamine, diethylamine, dipropylamine, dibutylamine, dipentylamine, dihexylamine, dimethanolamine, diethaholamine, and dipropanolamine. The replaced hydrocarbons may be different. This is also the same for the tertiary amine. Examples of the amine having different hydrocarbons include methylethylamine and methylpropylamine.

Examples of the tertiary amine include trimethylamine, triethylamine, tripropylamine, tributylamine, trihexylamine, trimethanolamine, triethanolamine, tripropanolamine, tributanolamine, tripropanolamine, triexanolamine, methyldiethylamine, and methyldipropylamine.

Examples of the cation of the ionic liquid include a 1-ethyl-3-methylimidazolium ion, a 1-methyl-3-propylimidazolium ion, a 1-butyl-3-methylimidazole ion, a 1-methyl-3-pentylimidazolium ion, and a 1-hexyl-3-methylimidazolium ion.

The position 2 of the imidazolium ion may be replaced. Examples of the cation which is the imidazolium ion having the replaced position 2 include a 1-ethyl-2,3-dimethylimidazolium ion, a 1,2-dimethyl-3-propylimidazolium ion, a 1-butyl-2,3-dimethylimidazolium ion, a 1,2-dimethyl-3-pentylimidazolium ion, and a 1-hexyl-2,3-dimethylimidazolium ion.

Examples of the pyridinium ion include methylpyridinium, ethylpyridinium, propylpyridinium, butylpyridinium, pentylpyridinium, and hexylpyridinium. In the imidazolium ion and the pyridinium ion, an alkyl group may be replaced, and an unsaturated bond may be present.

Examples of the anion include a fluoride ion, a chloride ion, a bromide ion, an iodide ion, $BF_4^-$, $PF_6^-$, $CF_3COO^-$, $CF_3SO3^-$, $NO_3^-$, $SCN^-$, $(CF_3SO_2)_3C^-$, bis(trifluoromethoxysulfonyl)imide, bis(trifluoromethoxysulfonyl)imide, and bis(perfluoroethylsulfonyl)imide. It may be a dipolar ion in which the cations and the anions of the ionic liquid are coupled by hydrocarbons. Incidentally, a buffer solution such as a potassium phosphate solution may be supplied to the storage parts 11, 12.

Figure 8:
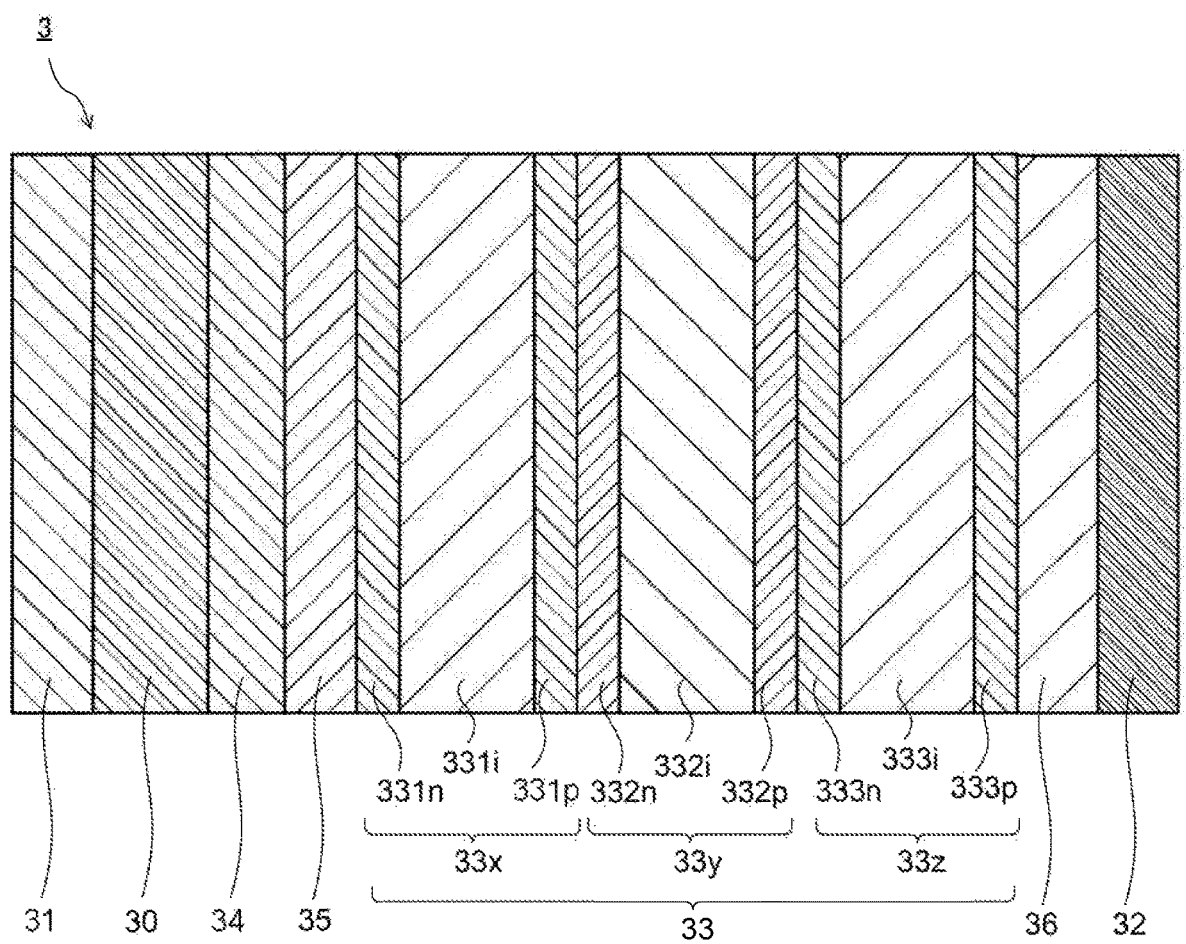
FIG. 8 is a schematic view illustrating a structure example of a photoelectric conversion cell.

FIG. 8 is a schematic cross-sectional view illustrating a structure example of a photoelectric conversion cell. The photoelectric conversation cell 3 illustrated in FIG. 8 includes a conductive substrate 30, a reduction electrode layer 31, an oxidation electrode layer 32, a photoelectric conversion layer 33, a light reflection layer 34, a metal oxide layer 35, and a metal oxide layer 36. For the description of the photoelectric conversion cell 3, the description of the photoelectric conversion cell 3a and the photoelectric conversion cell 3b can be referred to when necessary. For the description of the reduction electrode layer 31, the description of the reduction electrode layer 31a and the reduction electrode layer 31b can be referred to when necessary. For the description of the oxidation electrode layer 32, the description of the oxidation electrode layer 32a and the oxidation electrode layer 32b can be referred to when necessary. For the description of the photoelectric conversion layer 33, the description of the photoelectric conversion layer 33a and the photoelectric conversion layer 33b can be referred to when necessary.

The conductive substrate 30 is in contact with the reduction electrode layer 31. The conductive substrate 30 may be regarded as part of the reduction electrode layer. Examples of the conductive substrate 30 include a substrate containing at least one or more of Cu, Al, Ti, Ni, Fe, and Ag. For example, a stainless steel substrate containing stainless steel such as SUS may be used. The conductive substrate 30 is not limited to the above and may be formed of a conductive resin. Alternatively, the conductive substrate 30 may be constituted by a substrate of a semiconductor such as Si or Ge. Further, a resin film or the like may be used as the conductive substrate 30. For example, the film usable as the ion exchange membrane 4a and the ion exchange membrane 4b may be used as the conductive substrate 30.

The conductive substrate 30 has a function as a support. The conductive substrate 30 may be provided so as to separate the storage part 11 and the storage part 12. The presence of the conductive substrate 30 can improve mechanical strength of the photoelectric conversion cell 3. Further, the conductive substrate 30 may be regarded as part of the reduction electrode layer 31. Further, the conductive substrate 30 does not necessarily have to be provided.

The reduction electrode layer 31 preferably contains a reduction catalyst. The reduction electrode layer 31 may contain both a conductive material and the reduction catalyst. Examples of the reduction catalyst include a material that decreases activation energy for reducing carbon dioxide. In other words, a material that lowers overvoltage when a carbon compound is produced by the reduction reaction of carbon dioxide is usable. For example, a metal material or a carbon material is usable. For example, a metal such as gold, aluminum, copper, silver, platinum, palladium, or nickel, or an alloy containing this metal is usable as the metal material. As the carbon material, graphene, carbon nanotube (CNT), fullerene, or ketjen black is usable, for instance. The reduction catalyst is not limited to these, and may be, for example, a metal complex such as a Ru complex or a Re complex, or an organic molecule having an imidazole skeleton or a pyridine skeleton or may be a mixture of a plurality of materials.

The oxidation electrode layer 32 preferably contains an oxidation catalyst. The oxidation electrode layer 32 may contain both a conductive material and the oxidation catalyst. Examples of the oxidation catalyst include a material that decreases activation energy for oxidizing water. In other words, it may be a material that lowers overvoltage when oxygen and hydrogen ions are produced by the oxidation reaction of water. Examples thereof include iridium, platinum, cobalt, and manganese. Further, as the oxidation catalyst, a binary metal oxide, a ternary metal oxide, or a quaternary metal oxide is usable, for instance. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), and ruthenium oxide (Ru—O). Examples of the ternary metal oxide include Ni—Co—O, La—Co—O, Ni—La—O, and Sr—Fe—O. Examples of the quaternary metal oxide include Pb—Ru—Ir—O and La—Sr—Co—O. The oxidation catalyst is not limited to these, and a metal complex such as a Ru complex or a Fe complex is usable as the oxidation catalyst. Further, a mixture of a plurality of materials may also be used.

At least one of the reduction electrode layer 31 and the oxidation electrode layer 32 max have a porous structure. Examples of a material usable as the electrode layer having the porous structure include, in addition in the above-listed materials, carbon black such as ketjen black and VULCAN XC-72, activated carbon, and metal fine powder. The porous structure can increase the area of an active surface contributing to the oxidation-reduction reaction and thus can increase conversion efficiency.

In a case where an electrode reaction with a low current density is caused using relatively low irradiation energy of light, the catalyst material can be selected from a wide range of options. Accordingly, it is easy to cause the reaction using, for example, a ubiquitous metal, and it is also relatively easy to obtain selectivity of the reaction. On the other hand, in a case where the photoelectric conversion layer 33 is not disposed in the electrolytic solution tank 1 and is electrically connected to at least one of the reduction electrode layer 31 and the oxidation electrode layer 32 by, for example, a wiring line, the electrode area usually decreases due to a reason such as the downsizing of the electrolytic solution tank, and the reaction is sometimes caused with a high current density. In this case, a noble metal is preferably used as the catalyst.

The photoelectric conversion layer 33 has a stacked structure of a photoelectric conversion layer 33x, a photoelectric conversion layer 33y, and a photoelectric conversion layer 33z. The number of the stacked photoelectric conversion layers is not limited to that in FIG. 8.

The photoelectric conversion layer 33x has, for example, an n-type semiconductor layer 331n containing n-type amorphous silicon, an i-type semiconductor layer 331i containing intrinsic amorphous silicon germanium, and a p-type semiconductor layer 331p containing p-type microcrystalline silicon. The i-type semiconductor layer 331i is a layer that absorbs light in a short wavelength region including 400 nm, for instance. Accordingly, in the photoelectric conversion layer 33x, charge separation is caused by energy of light in the short wavelength region.

The photoelectric conversion layer 33y has, for example, an n-type semiconductor layer 332n containing n-type amorphous silicon, an i-type semiconductor layer 332i containing intrinsic amorphous silicon germanium, and a p-type semiconductor layer 332p containing p-type microcrystalline silicon. The i-type semiconductor layer 332i is a layer that absorbs light in a mid wavelength region including 600 nm, for instance. Accordingly, in the photoelectric conversion layer 33y, charge separation is caused by energy of light in the mid wavelength region.

The photoelectric conversion layer 33z has, for example, an n-type semiconductor layer 333n containing n-type amorphous silicon, an i-type semiconductor layer 333i containing intrinsic amorphous silicon, and a p-type semiconductor layer 333p containing p-type microcrystalline silicon. The i-type semiconductor layer 333i is a layer that absorbs light in a long wavelength region including 700 nm, for instance. Accordingly, in the photoelectric conversion layer 33z, charge separation is caused by energy of light in the long wavelength region.

The p-type semiconductor layers or the n-type semiconductor layers each can be formed of, for example, a semiconductor material to which an element that is to be a donor or an acceptor is added. Incidentally, in the photoelectric conversion layer, semiconductor layers containing silicon, germanium, or the like are used as the semiconductor layers, but this is not restrictive, and compound semiconductor layers are usable, for instance. As the compound semiconductor layers, semiconductor layers containing, for example, GaAs, GaInP, AlGaInP, CdTe, or CuInGaSe are usable, for instance. Further, layers containing a material such as $TiO_2$ or $WO_3$ may be used, provided that photoelectric conversion is possible. Further, the semiconductor layers each may be monocrystalline, polycrystalline, or amorphous. Further, the photoelectric conversion layer may include a zinc oxide layer.

The light reflection layer 34 is between the conductive substrate 30 and the photoelectric conversion layer 33. Examples of the light reflection layer 34 include a distributed Bragg reflection layer composed of a stack of metal layers or semiconductor layers, for instance. Owing to the presence of the light reflection layer 34, light that cannot be absorbed by the photoelectric conversion layer 33 can be reflected to enter one of the photoelectric conversion layer 33x to the photoelectric conversion layer 33z, enabling to enhance conversion efficiency from light to a chemical substance. As the light reflection layer 34, a layer of a meal such as Ag, Au, Al, or Cu or an alloy containing at least one of these metals is usable.

The metal oxide layer 35 is between the light reflection layer 34 and the photoelectric conversion layer 33. The metal oxide layer 35 has a function of enhancing light reflectivity by adjusting an optical distance, for instance. As the metal oxide layer 35, a material capable of ohmic contact with the n-type semiconductor layer 331n is preferable used. As the metal oxide layer 35, a layer of a transparent metal oxide such as, for example, indium tin oxide (ITO), zinc oxide (ZnO), fluorine-doped tin oxide (FTO), aluminum-doped zinc oxide (AZO), or antimony-doped tin oxide (ATO) is usable.

The metal oxide layer 36 is between the oxidation electrode layer 32 and the photoelectric conversion layer 33. The metal oxide layer 36 may be provided on a surface of the photoelectric conversion layer 33. The metal oxide layer 36 has a function as a protection layer preventing the photoelectric conversion cell 3 from being broken by the oxidation reaction. The presence of the metal oxide layer 36 can impede the corrosion of the photoelectric conversion layer 33 to increase the life of the photoelectric conversion cell 3. The metal oxide layer 36 does not necessarily have to be provided.

As the metal oxide layer 36, a dielectric thin film of $TiO_2$, $ZrO_2$, $Al_2O_3$, $SiO_2$, or $HfO_2$ is usable, for instance. The metal oxide layer 36 preferably has a thickness of 10 nm or less, further 5 nm or less. This is intended to obtain conductivity by a tunnel effect. As the metal oxide layer 36, a layer of a metal oxide having a light transmitting property such as, for example, indium tin oxide (ITO), zinc oxide (ZnO), fluorine-doped tin oxide (FTO), aluminum-doped zinc oxide (AZO), or antimony-doped tin oxide (ATO) may be used.

The metal oxide layer 36 may have, for example, a stacked structure of a metal and a transparent conductive oxide, a composite structure of a metal and another conductive material, or a composite structure of a transparent conductive oxide and another conductive material. The above structure can decrease the number of parts, decrease the weight, and facilitate the manufacture, enabling cost reduction. The metal oxide layer 36 may have functions as a protection layer, a conductive layer, and a catalyst layer.

In the photoelectric conversion cell 3 illustrated in FIG. 8, a face opposite to a contact surface between the n-type semiconductor layer 331n and the i-type semiconductor layer 331i is a first face of the photoelectric conversion layer 33, and a face opposite to a contact surface between the p-type semiconductor layer 333p and the i-type semiconductor layer 333i is a second face. As described above, the photoelectric conversion cell 3 illustrated in FIG. 8 is capable of absorbing light in a wide wavelength region of sunlight owing to the stack of the photoelectric conversion layer 33x to the photoelectric conversion layer 33z, enabling more efficient use of energy of sunlight. At this time, a high voltage can be obtained owing to the series connection of the photoelectric conversion layers.

In FIG. 8, electrons and holes having undergone the charge separation can be used as they are in the oxidation-reduction reaction, since the electrode layers are stacked on the photoelectric conversion layer 33. Further, the photoelectric conversion layer 33 and the electrode layers need not be electrically connected by wiring lines or the like. This enables the high-efficiency oxidation-reduction reaction.

The plural photoelectric conversion layers may be electrically connected in parallel. A two-junction or single-layer photoelectric conversion layer may be used. A stack of two photoelectric conversion layers or four photoelectric conversion layers or more may be used. A single-layer photoelectric conversion layer may be used instead of the stack of the plural photoelectric conversion layers.

Second Embodiment

Figure 9:
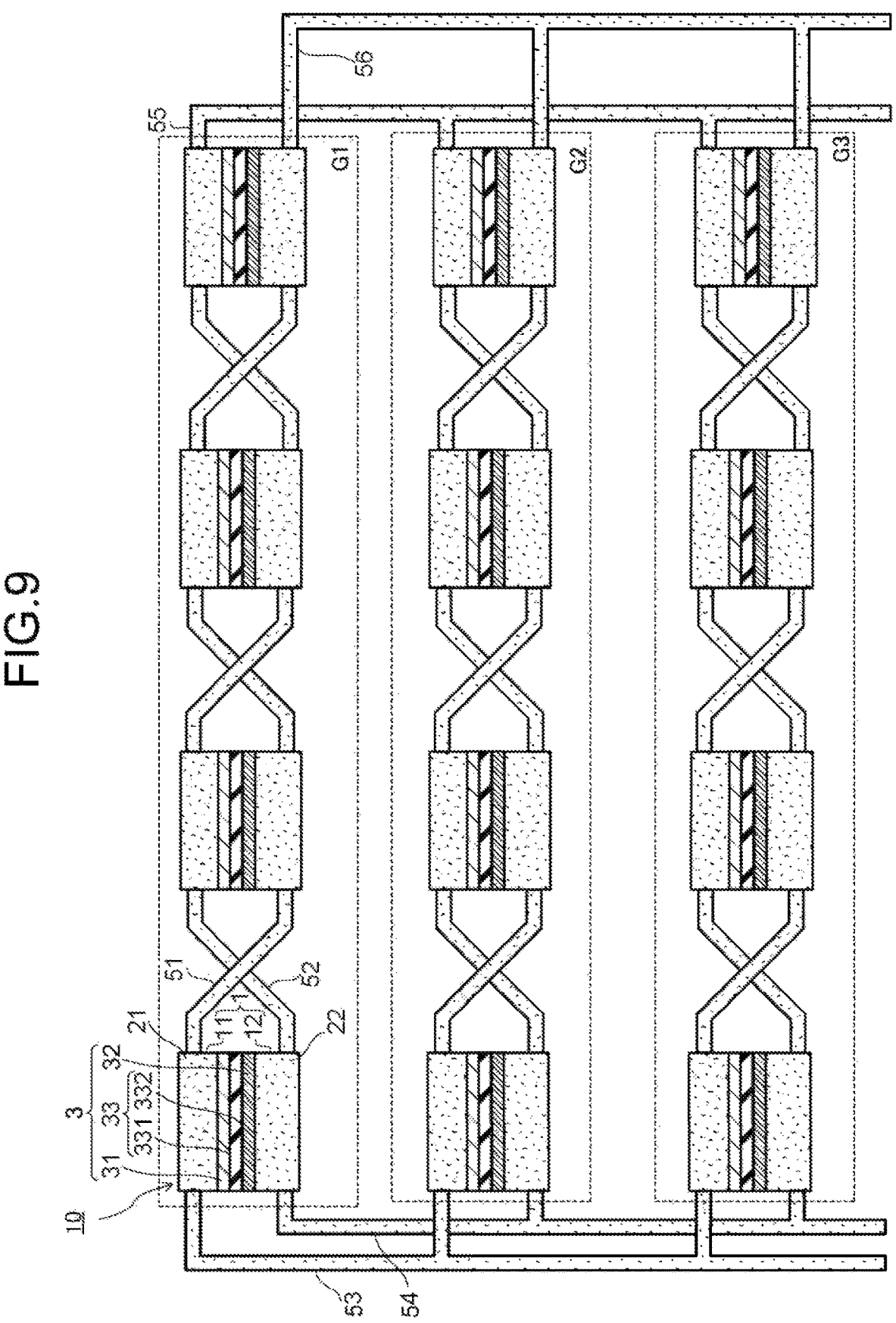
FIG. 9 is a schematic view illustrating another structure example of the electrochemical reaction device.

FIG. 9 is a schematic view illustrating a structure example of an electrochemical reaction device. The electrochemical reaction device illustrated in FIG. 9 includes a plurality of electrochemical reaction units 10a and flow paths 51 to 56.

The plural electrochemical reaction units 10 each include an electrolytic solution tank 1 and a photoelectric conversion cell 3 having a reduction electrode layer 31, an oxidation electrode layer 32, and a photoelectric conversion layer 33. The electrolytic solution tank 1 has a storage part 11 and a storage part 12. The storage part 11 stores an electrolytic solution 21. The storage part 12 stores an electrolytic solution 22. The reduction electrode layer 31 is immersed in the electrolytic solution 21. The oxidation electrode layer 32 is immersed in the electrolytic solution 22. The photoelectric conversion layer 33 has a face 331 and a face 332. The face 331 is electrically connected to the reduction electrode layer 31. The face 332 is electrically connected to the oxidation electrode layer 32.

For the description of the photoelectric conversion cell 3, the description of the photoelectric conversion cell 3a and the photoelectric conversion cell 3b can be referred to when necessary. For the description of the reduction electrode layer 31, the description of the reduction electrode layer 31a and the reduction electrode layer 31b can be referred to when necessary. For the description of the oxidation electrode layer 32, the description of the oxidation electrode layer 32a and the oxidation electrode layer 32b can be referred to when necessary. For the description of the photoelectric conversion layer 33, the description of the photoelectric conversion layer 33a and the photoelectric conversion layer 33b can be referred to when necessary.

The plural electrochemical reaction units 10 are divided into a plurality of groups, each group having two or more electrolytic solution tanks 1. In FIG. 9, they are divided into three groups, a group G1, a group G2, and a group G3, but the number of the groups is not limited to a particular number. Different groups may have different numbers of the electrolytic solution tanks 1.

The electrolytic solution tanks 1 in the same group are connected in series. The series-connected electrolytic solution tanks 1 in each group are connected in parallel to those of the other groups.

The flow paths 51 each connect the storage part 11 of one of the plural electrolytic solution tanks 1 and the storage part 12 of another one of the plural electrolytic solution tanks 1 that is series-connected to the aforesaid one of the electrolytic solution tanks 1. The flow paths 52 each connect the storage part 12 of the aforesaid one of the plural electrolytic solution tanks 1 and the storage part 11 of the aforesaid other one of the plural electrolytic solution tanks 1. The electrochemical reaction device only needs to include at least one kind of flow paths out of the flow paths 51 and the flow paths 52. In FIG. 9, the flow paths 51 and the flow paths 52 are each provided between the electrolytic solution tanks 1 in the same group. For the other description of the flow path 51 and the flow path 52, the description of the flow path 51 and the flow path 52 in the first embodiment can be referred to when necessary. The flow path 52 intersects with the flow path 51. This can reduce an installation area of the flow path 51 and the flow path 52.

Figure 10:
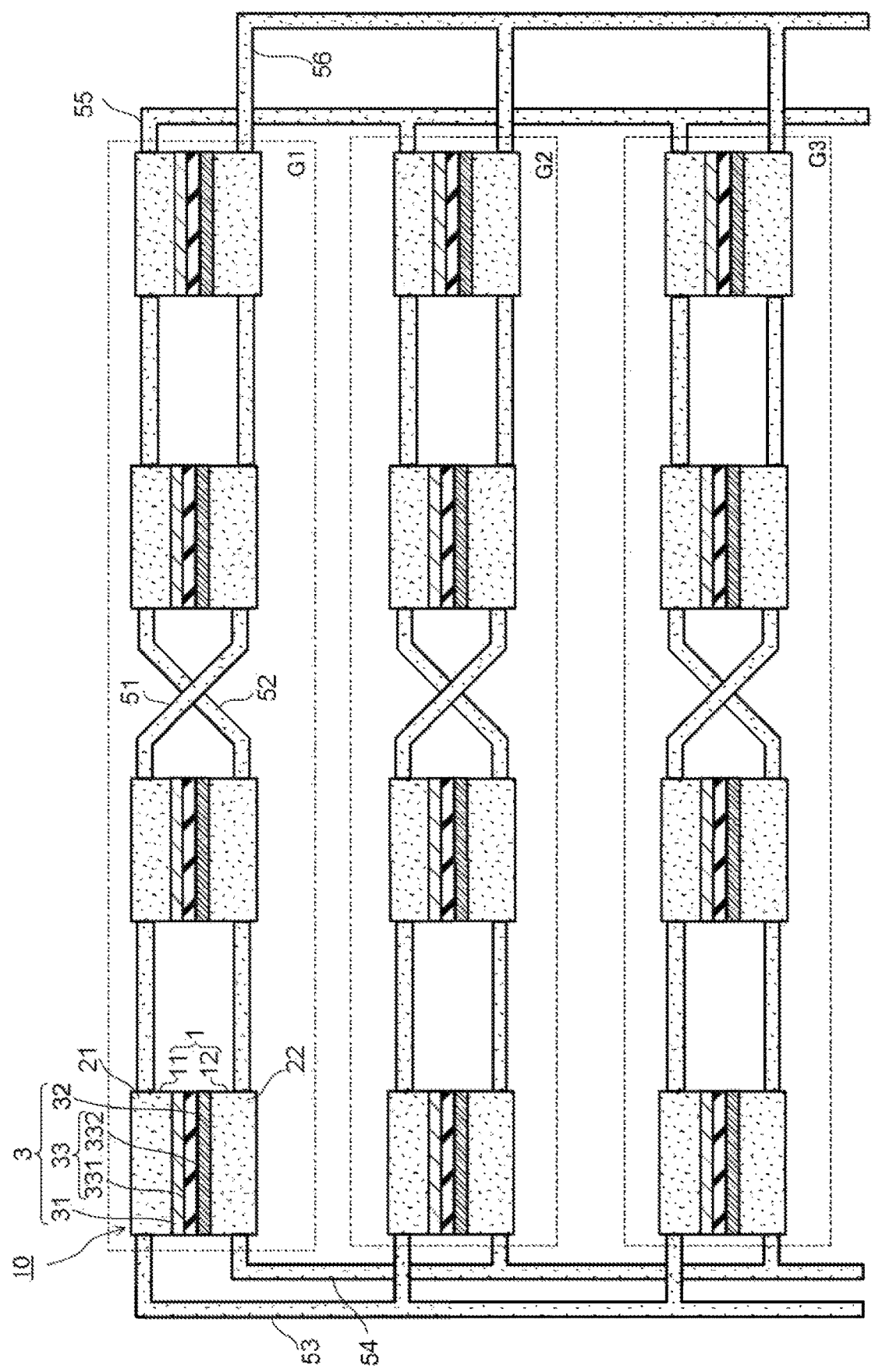
FIG. 10 is a schematic view illustrating another structure example of the electrochemical reaction device.

As illustrated in FIG. 10, at least one of the plural flow paths 51 may connect the storage part 11 of one of the plural electrolytic solution tanks 1 and the storage part 11 of another one of the plural electrolytic solution tanks 1 that is series-connected to the aforesaid one of the plural electrolytic solution tanks 1. At least one of the plural flow paths 52 may connect the storage part 12 of one of the plural electrolytic solution tanks 1 and the storage part 12 of another one of the plural electrolytic solution tanks 1 that is series-connected to the aforesaid one of the plural electrolytic solution tanks 1.

The flow path 53 is connected to the storage parts 11 of the electrolytic solution tanks 1 connected to ends of the groups. An electrolytic solution containing a substance to be reduced is supplied to the storage parts 11 of the electronic solution tanks 1 connected to the aforesaid ends, through the flow path 53. The flow path 54 is connected to the storage parts 12 of the electrolytic solution tanks 1 connected to the aforesaid ends. An electrolytic solution containing a substance to be oxidized is supplied to the storage parts 12 of the electrolytic solution tanks 1 connected to the aforesaid ends through the flow path 54.

The flow path 55 is connected to the storage parts 11 of the electrolytic solution tanks 1 connected to the other ends of the groups. At least part of the electrolytic solution 21 is discharged through the flow path 55 from the storage parts 11 of the electrolytic solution tanks 1 connected to the other ends. The flow path 56 is connected to the storage parts 12 of the electrolytic solution tanks 1 connected to the other ends. At least part of the electrolytic solution 22 is discharged through the flow path 56 from the storage parts 12 of the electrolytic solution tanks 1 connected to the other ends.

In the electrochemical reaction device of this embodiment, the flow paths can be shortened owing to the parallel connection of the plural groups each having two or more electrochemical reaction units connected in series, enabling a reduction of the manufacturing cost.

Figure 11:
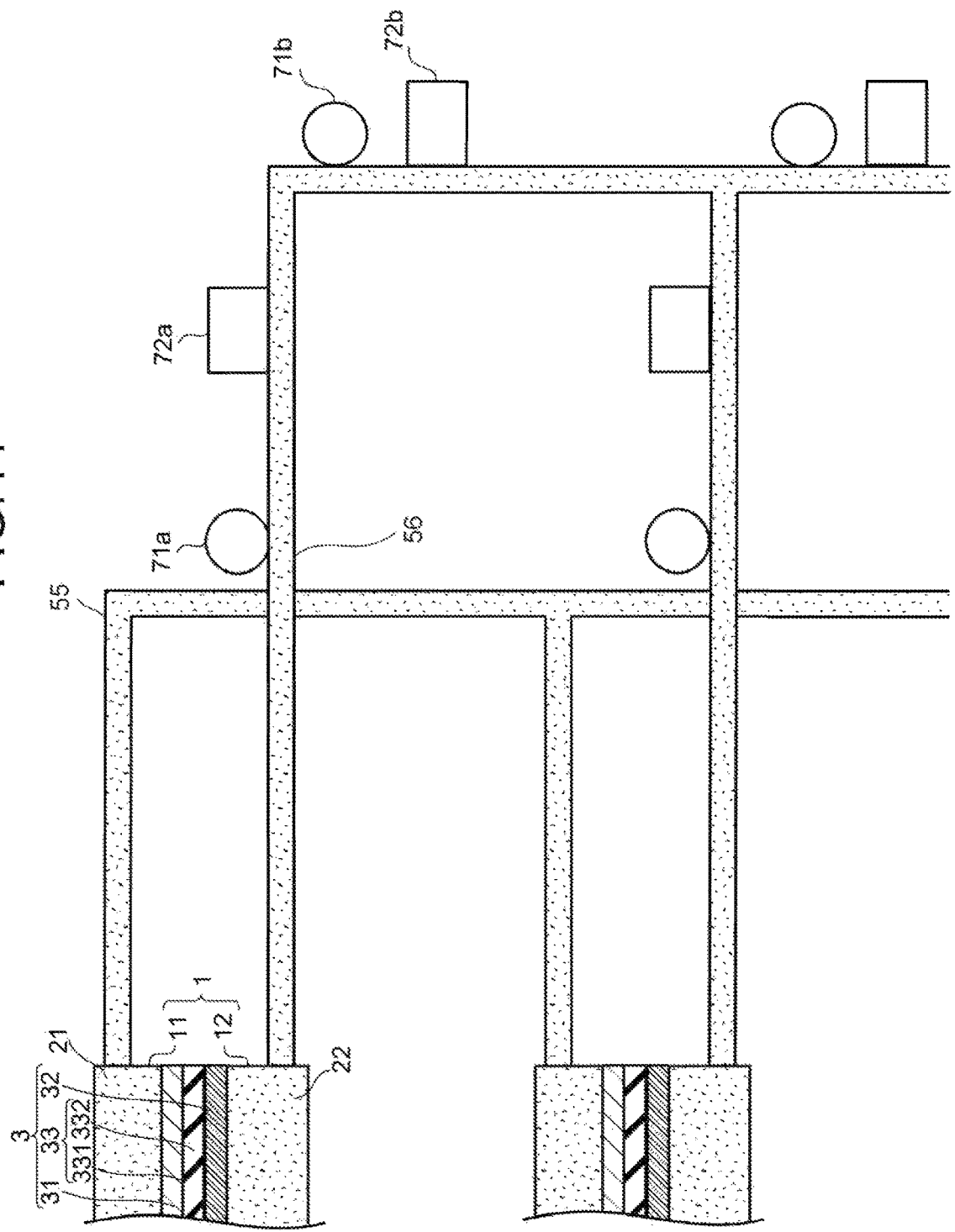
FIG. 11 is a schematic view illustrating part of another structure example of the electrochemical reaction device.

The electrochemical reaction device of this embodiment is not limited to the structure illustrated in FIG. 9. FIG. 11 is a schematic view illustrating part of another example of the electrochemical reaction device. The electrochemical reaction device illustrated in FIG. 11 is different from the electrochemical reaction device illustrated in FIG. 9 at least in that it includes sensors 71a, 71b which obtain data indicating states of the electrolytic solutions flowing in the flow paths and regulators 72a, 72b which regulate the states of the electrolytic solutions according to the data.

The sensors 71a each have a function of obtaining temperature data indicating the temperature of the electrolytic solution flowing in, for example, the flow path 56. The sensor 71a is provided for every group, for instance.

The regulators 72a each have a junction of regulating the temperature of the electrolytic solution flowing in the flow path 56 according to the temperature data. Examples of the regulator 72a include a heater. For example, a control circuit generates a control signal instructing the temperature to be set, an operation time, and so on of the heater, according to the temperature data. The heater heats the electrolytic solution at the set temperature or for the operation time instructed by the control signal to regulate the temperature of the electrolytic solution. The regulator 72a may have the sensor 71a.

The sensors 71a each may determine the temperature of the electrolytic solution flowing in the flow path 55. At this time, the regulator 72a has a function of regulating the temperature of the electrolytic solution flowing in the flow path 55 according to the temperature data.

The sensors 71b each have a function of obtaining flow rate data indicating the flow rate of the electrolytic solution flowing in the flow path 56. The sensor 71b is provided for every group, for instance.

The regulators 72b each have a function of regulating the flow rate of the electrolytic solution flowing in the flow path 56 according to the flow rate data. Examples of the regulator 72b include a flow regulator. For example, the control circuit generates a control signal for the flow regulator according to the flow rate data. The flow regulators each regulate the flow rate of the electrolytic solution according to the control signal. The regulator 72b may have the sensor 71b.

The sensors 71b each may determine the flow rate of the electrolytic solution flowing in the flow path 55. At this time, the regulator 72b has a function of regulating the flow rate of the electrolytic solution flowing in the flow path 55 according to the flow rate data.

The electrochemical reaction device may include: a pressure sensor which obtains pressure data indicating a pressure applied to the electrolytic solution flowing in the flow path 55 or the flow path 56; and a regulator which regulates the pressure applied to the electrolytic solution flowing in the flow path 55 or the flow path 56 according to the pressure data.

In the electrochemical reaction device illustrated in FIG. 11, the sensor and regulator are provided for every group. This can make the number of the sensors and the regulators smaller than providing the sensor and the regulator for every electrochemical reaction unit. As a result, the manufacturing cost can be reduced.

The structures illustrated in FIG. 3 to FIG. 7 may be applied to the electrochemical reaction devices illustrated in FIG. 9 to FIG. 11. For example, the electrochemical reaction device may further include a flow path connecting the storage part 11 of at least one of the plural electrolytic solution tanks 1 and the storage part 12 of at least one of the plural electrolytic solution tanks 1. The electrochemical reaction device may further include: a sensor which obtains data indicating the state of at least one of the temperature, the flow rate, and the pressure of the electrolytic solution flowing in the aforesaid flow path; and a regulator which regulates the state of the electrolytic solution flowing in the aforesaid flow path according to the data. Arrangement places of the sensor and the regulator are not limited to specific places, and they may be provided in contact with any of the flow paths, for instance. The sensor is preferably provided at the most downstream part (side connected to the flow path 55 and the flow path 56), for instance. This facilitates the estimation of the reaction of the whole group. The number of the sensors may be plural.

The electrochemical reaction device may further include a carbon dioxide supply part which supplies carbon dioxide to the electrolytic solution 21 stored in the storage part 11 of at least one of the plural electrolytic solution tanks 1. The electrochemical reaction device may further include a mixing tank connecting the flow path 51 and the flow path 52 and storing the electrolytic solution. It may further include: a sensor which obtains data indicating the state of at least one of pH, the temperature, the flow rate, and the pressure of the electrolytic solution stored in the mixing tank; and a regulator which regulates the state of the electrolytic solution stored in the mixing tank according to the data.

For the description of the sensor and the regulator of the electrochemical reaction device of the second embodiment, the description of the sensor and the regulator of the electrochemical reaction device of the first embodiment can be referred to when necessary.

EXAMPLES

Example 1

In this example, an electrochemical reaction device including an electrochemical reaction unit was fabricated.

A structure was prepared. The structure includes: a three-junction photoelectric conversion layer with a 500 nm thickness; a 300 nm thick ZnO layer provided on a first face of the three-junction photoelectric conversion layer; a 200 nm thick Ag layer provided on the ZnO layer; a 1.5 mm thick SUS substrate provided on the Ag layer; and a 100 nm thick ITO layer provided on a second face of the three-junction photoelectric conversion layer.

The three-junction photoelectric conversion layer has a first photoelectric conversion layer which absorbs light in a short wavelength region, a second photoelectric conversion layer which absorbs light in a mid wavelength region, and a third photoelectric conversion layer which absorbs light in a long wavelength region. The first photoelectric conversion layer has a p-type microcrystalline silicon layer, an i-type amorphous silicon layer, and an n-type amorphous silicon layer. The second photoelectric conversion layer has a p-type microcrystalline silicon layer, an i-type amorphous silicon germanium layer, and an n-type amorphous silicon layer. The third photoelectric conversion layer has a p-type microcrystalline silicon layer, an i-type amorphous silicon layer, and an n-type amorphous silicon layer.

An open-circuit voltage when the structure was irradiated with light using a solar simulator (AM1.5, 1000 W/cm$^2$) was measured. The open-circuit voltage was 2.1 V.

A $Ni(OH)_2$ layer with a 200 nm thickness was formed as an oxidation catalyst on the ITO layer on the structure of the three-junction photoelectric conversion layer by an electrodeposition method using nickel nitrate. A Pt layer with a 500 nm thickness was formed as a reduction catalyst on the SUS substrate by sputtering.

The above structure was cut into a square shape and its edge portions were sealed with a thermosetting epoxy resin. The periphery of the structure was surrounded by an ion exchange membrane (Nafion (registered trademark)), whereby the structure was formed into a single sheet shape. A 10 cm square unit was fabricated from the combination of the ion exchange membrane and a plurality of cells, and ten pieces of the units were arranged in each of the vertical and lateral directions to fabricate an about 100 cm square electrochemical reaction unit. The sheet shape may be formed by, for example, embedding photoelectric conversion cells in a plurality of holes of one ion exchange membrane having the plural holes. The sheet shape may be formed by arranging a plurality of structures in each of which a photoelectric conversion cell is embedded in a hole of an ion exchange membrane having one hole. Ion exchange membranes may be embedded in holes of photoelectric conversion cells each having a hole.

This sheet-shaped electrochemical reaction unit is sandwiched by a pair of 3 cm thick frames each having a hollow portion with 100 cm length×100 cm width, and a silicon resin layer was formed between the pair of frames. A window formed of non-reflective glass for solar cell was fabricated to cover the hollow portion of one of the pair of frames. An acrylic resin plate was formed to cover the hollow portion of the other of the pair of frames. Consequently, a sealed body encapsulating the electrochemical reaction unit was fabricated. Electrolytic solution flow paths were provided on the $Ni(OH)_2$ layer side and the PT layer side of the electrochemical reaction unit respectively. As the electrolytic solution, a 0.5 M aqueous potassium hydrogen phosphate solution containing saturated $CO_2$ gas was used. A gas recovery flow path for capturing produced gas was provided in part of an electrolytic solution tank. Through the above, an electrochemical reaction module was fabricated. An acrylic vessel with an internal volume of 30 cm×3 cm×3 cm was connected as a mixing tank to the Pt layer side of the module.

The two modules were juxtaposed, the flow paths of the modules and the mixing tank were connected by a vinyl chloride resin, an electrolytic solution impeller pump, a pH sensor, and a temperature sensor were provided in the mixing tank, and a signal line was drawn out of the mixing tank by a lead sealed with a silicone resin. Light was emitted to the structure through the window using the solar simulator (AM1.5, 1000 $W/cm^2$) to cause a reaction. The current density of an electrode reaction, was 2.5 $mA/cm^2$. The reaction time was six hours. pH of the electrolytic solution on the oxidation electrode side and pH of the electrolytic solution on the reduction electrode side were 7 before the reaction. On the other hand, pH of the electrolytic solution on the oxidation electrode side was 8 and pH of the electrolytic solution of the reduction electrode side was 5 after the reaction.

Comparative Example 1

A composite substrate (4 cm square) having a 1.5 mm thick SUS substrate connected to a power source via a lead and a 100 nm thick platinum film provided on the SUS substrate, and a platinum foil (4 cm square) were prepared. The power source is a simulation device of a solar cell. An electrolytic solution flow path and a gas flow path were formed on each of an oxidation electrode side and a reduction electrode side of a 5 cm square acrylic frame with a 1 cm thickness. The composite substrate and the platinum foil were enclosed in the frame, an ion exchange membrane (Nafion 117, 6 cm square) was provided between the composite substrate and the platinum foil, and a module sandwiched by a silicon rubber sheet and an acrylic plate (7 cm length×7 cm width×3 mm thickness) provided on an outer side of the composite substrate and an outer side of the platinum foil respectively was fabricated. A potassium phosphate buffer solution with pH 7 was supplied into the module. The composite substrate was a reduction electrode and the platinum foil was an oxidation electrode. As an electrolytic solution on the oxidation electrode side and an electrolytic solution on the reduction electrode side, 0.5 M aqueous potassium hydrogen carbonate solutions were used.

In the above-described module, a current was passed with a 10 $mA/cm^2$ current density to cause a 1.5 hour reaction. The electrolytic solution on the oxidation electrode side and the electrolytic solution on the reduction electrode side had pH 7 before the reaction. After the reaction, on the other hand, the electrolytic solution on the oxidation electrode side had pH 11.12 and the electrolytic solution on the reduction electrode side had pH 3.85.

Example 2

A first module constituted by the module of the comparative example 1 and a second module constituted by the module of the comparative example 1 were juxtaposed, and the electrolytic solution flow path on the oxidation electrode side of the first module and the electrolytic solution flow path on the reduction electrode side of the second module were connected by a first silicon tube. The electrolytic solution flow path on the reduction electrode side of the first module and the electrolytic solution flow path on the oxidation electrode side of the second module were connected by a second silicon tube. Tube pumps were connected to the electrolytic solution flow paths respectively, and the electrolytic solutions were circulated at 0.3 cc/minute. A current was passed with a current density of 10 $mA/cm^2$ to cause a 1.5 hour reaction. In the first module, the electrolytic solution on the oxidation electrode side had pH 7.00 and the electrolytic solution on the reduction electrode side had pH 6.79. In the second module, the electrolytic solution on the oxidation electrode side had pH 6.99 and the electrolytic solution on the reduction electrode side had pH 6.55.

Example 3

In this example, an electrochemical reaction device including an electrochemical reaction unit was fabricated.

A 0.1 mm thick first SUS substrate, a 0.1 mm thick first SUS substrate, and a generator was prepared. The first and second substrates are electronically connected to the generator.

The generator has twelve crystalline silicon solar cells. The solar cells each have a planar size of 8 mm in depth×100 mm in width. The twelve solar cells are divided into first, second, and third groups. The first, second, and third groups, each have four solar cells. The four solar cells in the same group are electronically connected in serial. The cells in the first group, the cells in the second group, and the cells in the third group are electronically connected in parallel.

An open-circuit voltage when the structure was irradiated with light using a solar simulator (AM1.5, 1000 $W/cm^2$) was measured. The open-circuit voltage was 2.4 V.

A $Ni(OH)_2$ layer with a 200 nm thickness was formed as an oxidation catalyst on the first SUS substrate by an electrodeposition method using nickel nitrate. A Pt layer with a 500 nm thickness was formed as a reduction catalyst on the second SUS substrate.

The first SUS substrate after the process of forming the $Ni(OH)_2$ layer and the second SUS substrate after the process of forming the Pt layer were each cut into a 10 cm square shape. A cell was formed by disposing an ion exchange membrane (Nafion (registered trademark))

between the first and second SUS substrates and sandwiching the Nafion membrane between vessels with an internal volume of 1 cm×11 cm×11 cm. A 12 cm square unit was fabricated from the combination of a plurality of cells, and ten pieces of the units were arranged in each of the vertical and lateral directions to fabricate an about 100 cm square electrochemical reaction unit. The sheet shape may be formed by, for example, embedding photoelectric conversion cells in a plurality of holes of one ion exchange membrane having the plural holes. The sheet shape may be formed by arranging a plurality of structures in each of which a photoelectric conversion cell is embedded in a hole of an ion exchange membrane having one hole. Ion exchange membranes may be embedded in holes of photoelectric conversion cells each having a hole.

This sheet-shaped electrochemical reaction unit is sandwiched by a pair of 3 cm thick frames each having a hollow portion with 100 cm length×100 cm width, and a silicon resin layer was formed between the pair of frames. A window formed of non-reflective glass for solar cell was fabricated to cover the hollow portion of one of the pair of frames. An acrylic resin plate was formed to cover the hollow portion of the other of the pair of frames. Consequently, a sealed body encapsulating the electrochemical reaction unit was fabricated. Electrolytic solution flow paths were provided on the $Ni(OH)_2$ layer side and the PT layer side of the electrochemical reaction unit respectively. As the electrolytic solution, a 0.5 M aqueous potassium hydrogen phosphate solution containing saturated $CO_2$ gas was used. A gas recovery flow path for capturing produced gas was provided in part of an electrolytic solution tank. Through the above, an electrochemical reaction module was fabricated. An acrylic vessel with an internal volume of 30 cm×3 cm×3 cm was connected as a mixing tank to the Pt layer side of the module.

The two modules were juxtaposed, the flow paths of the modules and the mixing tank were connected by a vinyl chloride resin, an electrolytic solution impeller pump, a pH sensor, and a temperature sensor were provided in the mixing tank, and a signal line was drawn out of the mixing tank by a lead sealed with a silicone resin. Light was emitted to the structure through the window using the solar simulator (AM1.5, 1000 $W/cm^2$) to cause a reaction. The current density of an electrode reaction was 2.5 $mA/cm^2$. The reaction time was six hours. pH of the electrolytic solution on the oxidation electrode side and pH of the electrolytic solution on the reduction electrode side were 7 before the reaction. On the other hand, pH of the electrolytic solution on the oxidation electrode side was 8 and pH of the electrolytic solution of the reduction electrode side was 5 after the reaction.

From the above, it is understood that a difference between pH of the electrolytic solution on the reduction electrode side and pH of the electrolytic solution on the oxidation electrode side is smaller in the examples 1 to 3 than in the comparative example 1. By thus providing the flow path connecting the electrolytic solution on the oxidation electrode side in one of the first module and the second module to the electrolytic solution on the reduction electrode side in the other of the first module and the second module, it is possible to reduce a pH change of the electrolytic solution on the oxidation electrode side and the electrolytic solution on the reduction electrode side. This can prevent a decrease of an output of the whole device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrochemical reaction device, comprising:
   first reactors, each first reactor including
      a first tank having a first room and a second room,
      a first reduction electrode disposed in the first room, and
      a first oxidation electrode disposed in the second room;
   second reactors, each second reactor including
      a second tank having a third room and a fourth room,
      a second reduction electrode disposed in the third room, and
      a second oxidation electrode disposed in the fourth room;
   first pipes connecting the first tanks in series, one of the first pipes connecting the first room of one of the first tanks and the second room of another one of the first tanks;
   second pipes connecting the first tanks in series, one of the second pipes connecting the second room of the one of the first tanks and the first room of the other one of the first tanks;
   third pipes connecting the second tanks in series, one of the third pipes connecting the third room of one of the second tanks and the fourth room of another one of the second tanks;
   fourth pipes connecting the second tanks in series, one of the fourth pipes connecting the fourth room of the one of the second tanks and the third room of the other one of the second tanks;
   fifth pipes connecting the series-connected first tanks and the series-connected second tanks in parallel, one of the fifth pipes connecting the first room of the first one of the series-connected first tanks and the first room the first one of the series-connected second tanks, another one of the fifth pipes connecting the first room of the last one of the series-connected first tanks and the first room the last one of the series-connected first tanks; and
   sixth pipes connecting the series-connected first tanks and the series-connected second tanks in parallel, one of the sixth pipes connecting the second room of the first one of the series-connected first tanks and the second room the first one of the series-connected second tanks, another one of the sixth pipes connecting the second-room of the last one of the series-connected first tanks and the second room the last one of the series-connected second tanks.

2. The device according to claim 1, further comprising a photoelectric converter having a first surface on the first oxidation electrode and a second surface on the first reduction electrode.

3. The device according to claim 1, further comprising:
   a seventh pipe connecting the first and second rooms of the one of the first tanks; and
   an eighth pipe connecting the first and second rooms of the one of the second tanks.

4. The device according to claim 3, further comprising:
   a first sensor to acquire a first data indicating at least one parameter selected from the group consisting of a temperature, a flow rate, and a pressure of an electrolytic solution through the seventh pipe; and a first regulator to regulate the at least one parameter in accordance with the first data.

5. The device according to claim 1, further comprising a carbon dioxide source to supply carbon dioxide to the one of the fifth paths, wherein the one of the fifth pipes is configured so that the first electrolytic solution flows therethrough, the first electrolytic solution containing the carbon dioxide, wherein the one of the sixth pipes is configured so that the second electrolytic solution flows therethrough, the second electrolytic solution containing water.

6. The device according to claim 1, further comprising a third tank connecting the one of the first pipes and the one of the second pipes.

7. The device according to claim 6, further comprising:

a second sensor to acquire a second data indicating at least one second parameter selected from the group consisting of pH, a temperature, a flow rate, and a pressure of an electrolytic solution in the third tank; and a second regulator to regulate the at least one second parameter in accordance with the second data.

8. The device according to claim 1, further comprising:

a third sensor to acquire a third data indicating at least one third parameter selected from the group consisting of a temperature, a flow rate, and a pressure of an electrolytic solution through the other one of the fifth pipes; and a third regulator to regulate at least one third parameter in accordance with the third data.

* * * * *

UNITED STATES PATENT AND TRADEMARK OFFICE
CERTIFICATE OF CORRECTION

PATENT NO. : 10,544,513 B2
APPLICATION NO. : 16/286837
DATED : January 28, 2020
INVENTOR(S) : Akihiko Ono et al.

Page 1 of 1

It is certified that error appears in the above-identified patent and that said Letters Patent is hereby corrected as shown below:

On the Title Page

Item (30) the Foreign Application Priority Data. Item (30) should read:
-- (30) Foreign Application Priority Data
July 31, 2015 (JP) ................. 2015-152262 --

Signed and Sealed this
Seventeenth Day of March, 2020

Andrei Iancu
*Director of the United States Patent and Trademark Office*